United States Patent [19]

Ueno et al.

[11] Patent Number: 5,479,206

[45] Date of Patent: Dec. 26, 1995

[54] IMAGING SYSTEM, ELECTRONIC CAMERA, COMPUTER SYSTEM FOR CONTROLLING SAID ELECTRONIC CAMERA, AND METHODS OF CONTROLLING SAME

[75] Inventors: Hitoshi Ueno; Kouji Matsuura; Fumihiro Funazaki; Kazuya Oda; Masahiro Konishi; Yoshiki Kawaoka, all of Tokyo, Japan

[73] Assignee: Fuji Photo Film Co., Ltd., Minami-ashigara, Japan

[21] Appl. No.: 12,463

[22] Filed: Feb. 2, 1993

[30] Foreign Application Priority Data

| Feb. 4, 1992 | [JP] | Japan | 4-047626 |
| Feb. 4, 1992 | [JP] | Japan | 4-047627 |
| Feb. 4, 1992 | [JP] | Japan | 4-047628 |
| Feb. 4, 1992 | [JP] | Japan | 4-047629 |
| Mar. 9, 1992 | [JP] | Japan | 4-085001 |

[51] Int. Cl.$^6$ .................................. H04N 5/30
[52] U.S. Cl. .................. 348/211; 348/213; 348/552; 348/240; 348/143
[58] Field of Search .................. 348/211, 213, 348/13, 552, 239, 240, 594, 597, 143; H04N 5/30

[56] References Cited

U.S. PATENT DOCUMENTS

| 4,945,367 | 7/1990 | Blackshear | 348/143 |
| 4,963,981 | 10/1990 | Todaka et al. | 348/240 |
| 4,974,088 | 11/1990 | Sasaki | 348/213 |
| 4,996,592 | 2/1991 | Yoshida | 348/13 |
| 5,068,735 | 11/1991 | Tuchiya et al. | 348/213 |
| 5,164,831 | 11/1992 | Kuchta et al. | 348/233 |
| 5,172,234 | 12/1992 | Arita et al. | 348/240 |
| 5,206,721 | 4/1993 | Ashida et al. | 348/15 |
| 5,218,627 | 6/1993 | Corey et al. | 348/211 |

*Primary Examiner*—Joseph Mancuso
*Assistant Examiner*—Bipin Shalwala

[57] ABSTRACT

The time required for transmission of image data from an electronic camera to a host computer is shortened. Image data representing the image of a subject imaged in the electronic camera is stored in an image memory. When a preview-image command is applied to the electronic camera from the host computer, the image data that has been stored in the image memory is reduced to ⅛ by eliminating pixels in a thinning-out circuit. The reduced-image data is transmitted to the host computer, where the data is displayed on a display unit as a preview image. A desired area and magnification (resolution) are designated on the preview image and then a get command is applied, whereupon main image data in the designated area and having the designated magnification is transmitted from the electronic camera to the host computer.

36 Claims, 30 Drawing Sheets

IMAGING SYSTEM, ELECTRONIC CAMERA, COMPUTER SYSTEM FOR CONTROLLING SAID ELECTRONIC CAMERA, AND METHODS OF CONTROLLING SAME

BACKGROUND OF THE INVENTION

1. Field of the Invention

This invention relates to an imaging system, an electronic camera, a computer system for controlling the electronic camera, and a method of controlling these systems as well as the electronic camera.

2. Description of the Related Art

Electronic cameras for photographing a subject and outputting an analog video signal or digital image signal which represents the image of the photographed subject include video cameras, still-video cameras (electronic still-video cameras), digital still-video cameras (digital electronic still-video cameras), etc.

Without exception, these electronic cameras are such that shutter release, as a matter of course, and the setting (with the exception of cases in which automatic setting is performed) of so-called camera control parameters for image pick-up and image processing, such as amount of exposure (f-stop and shutter speed) and white balance, are carried out on the side of the electronic camera using switches, buttons, etc., provided on the electronic camera.

Electronic cameras, especially digital-type electronic cameras in which digital image data is obtained, have recently become the focus of much attention since they make possible the development of applications that can be used in tandem with a computer system. For example, new media can be created by preserving image data, which represents the image of the subject obtained from the electronic camera, on a recording medium such as an optical disk or magnetic disk provided in a computer system, and editing the image data. This new media can be utilized in the presentation of official reports, advertisements and data, as well as in the provision of information, using visual images.

In order to create such new media, the image data obtained by photography using the electronic camera must be transmitted to the computer system. Since the image data generally is of great volume, transmission requires a long period of time.

Before the image data representing the image of the subject photographed by the electronic camera is stored on the recording medium, determining whether the subject has been photographed properly is important. If photography is improper, it is required that photography, inclusive of resetting of the camera control parameters, be performed again.

In order to visually determine whether the subject has been photographed properly, it is required that the image of the subject represented by the digital image data obtained from the electronic camera be displayed on a display unit. When it is attempted to display the image of the subject on the screen of a display unit provided in the computer system, it is necessary for all of the image data to be transmitted from the electronic camera to the computer system. As a result, the transmission time is prolonged, as mentioned above, and efficiency declines.

The setting of the camera control parameters for photography is carried out in the electronic camera, as mentioned above. Whenever the photographic conditions are changed, the operator of the computer system is compelled to go to the location of the electronic camera to make the necessary adjustments. This is a troublesome task.

Furthermore, it is not necessarily desirable for the entirety of the image of the subject photographed by the electronic camera to be always stored on the recording medium. There are cases in which only part of the photographed image of the subject is required. If only the necessary image data is cut out and stored on the recording medium, the volume of data is reduced. In addition, the image stored on the recording medium is required to be enlarged or reduced as needed.

In an imaging system configured by linking an electronic camera and a computer system in view of the foregoing points, it is preferred that the imaging system be so arranged that such operations as the operation for performing photography, the operation for communicating the image data and the operation for storing the image data on the recording medium all be implementable on the side of the computer system.

A solid-state electronic image sensing device such as a CCD has the advantage of being small in size and therefore is utilized in electronic still-video cameras and the like. However, a solid-state electronic image sensing device may produce an output of a spurious signal indicative of smear or the like, and flicker may occur owing to a difference in the magnitude of dark current caused by a difference in field read-out time. Consequently, in a case where the solid-state electronic image sensing device is utilized in an electronic still-video camera, it is necessary to prevent output of the spurious signal and to perform photographic processing through which the dark currents are made to coincide every field.

Conventional photographic processing operations for sweeping out smear charge and making the magnitudes of dark current coincide are controlled separately by an imaging processor contained in the electronic still-video camera. Consequently, a problem which arises is that there is an increase in the number of control lines in the electronic still-video camera, which are provided in addition to those for recording. It is vital that this problem be solved, especially in an electronic still-video camera having a separable camera head.

SUMMARY OF THE INVENTION

The principal object of the invention is to make it possible to rapidly transmit image data from an electronic camera to a computer system in order to verify a photographed image and store the image on a recording medium.

Another object of the invention is to arrange it so that image data treated so as to be suited for storage on a recording medium can be obtained from an electronic camera.

Still another object of the invention is to arranged it so that photography by an electronic camera as well as the setting of conditions for photography can be performed in a computer system.

A further object of the invention is to arranged it so that the set ting of camera control parameters such as amount of exposure and various balances in an imaging system composed of a combination of an electronic camera and computer system can be performed on the side of the computer system.

A further object of the invention is to arrange it so that the number of control lines for recording a subject can be reduced in an electronic still-video camera which picks up the image of the subject using a solid-state electronic image sensing device.

An imaging system according to a first aspect of the present invention comprises an electronic camera, which has electronic image pick-up processing means for photographing a subject and producing image data representing an image of the photographed subject, and a computer system equipped with a display unit and an input unit and connected to the electronic camera by a communication line.

The electronic camera includes an image memory for storing the image data produced by the electronic image pick-up processing means, image reducing means for reducing, at a given magnification, the image data stored in the image memory, and first response means, operative when a preview command is applied thereto from the computer system, for causing the image reducing means to reduce the image data at the given magnification and transmitting the reduced image data to the computer system.

The computer system includes first command means for transmitting the preview command to the electronic camera when a preview input is applied through the input unit, and first display control means, operative when the reduced image data transmitted from the first response means of the electronic camera in response to the preview command is received, for displaying a reduced preview image represented by the reduced image data, on the display unit.

The present invention further provides a method of controlling the above-mentioned imaging system, the electronic camera and computer system which construct the imaging system, and methods of controlling the electronic camera and computer system.

In accordance with the invention, the image data representing the image of the subject picked up in the electronic camera is reduced, transmitted to the computer and displayed on the display unit when the preview command is applied to the electronic camera from the computer system. Since the amount of image data is small, transmission time can be shortened. Whether or not an acceptable image has been obtained can be judged by observing the preview image displayed.

In a preferred embodiment of the invention, the electronic camera further comprises second response means operative when a get command containing data designating magnification of a main image as well as an area to be cut from the main image is applied to the computer system, for creating main-image data and transmitting it to the computer system, wherein the main-image data has the magnification designated with regard to the image data of the designated area.

In this preferred embodiment, the computer system includes second command means, operative when the magnification of the main image, the designation of the area to be cut from the main image and a get input of the main image are applied through the input unit, for transmitting the get command, which contains the data designating the applied magnification and area, to the electronic camera, and second display control means, operative when the main-image data transmitted from the second response means of the electronic camera in response to the get command is received, for displaying the main image represented by this main-image data on the display unit.

Thus, the area to be cut from the main image on the reduced preview image displayed and the magnification of the main image can be designated in the computer system. Main-image data having the designated magnification of the designated area is transmitted from the electronic camera in conformity with the designations of area and magnification and the get command. As a result, the main-image data can be displayed on the display unit and stored on a recording medium.

Further, the main-image data transmitted from the electronic camera to the computer system is solely that within the designated area. Accordingly, the amount of data generally is small in comparison with the image data in the entire area. This is useful also in curtailing transmission time.

In another embodiment of the invention, the computer system transmits a photographic command to the electronic camera prior to the preview command. The electronic camera causes the electronic image pick-up processing means to start photography of the subject in response to the photographic command.

Thus, the shutter release of the electronic camera can be carried out in the computer system.

According to still another embodiment of the invention, the computer system further includes control-parameter command means for setting control parameters, which are for photography of the subject by the electronic image pick-up processing means of the electronic camera, in the input unit and transmitting the set control parameters to the electronic camera. The electronic image pick-up processing means of the electronic camera executes image pick-up processing in conformity with the control parameters applied by the control-parameter command means.

Since control parameters which represent the photographic conditions of the electronic camera can be set in the computer system, all of the photographic operations in the electronic camera can be carried out by the computer system.

An imaging system according to a second aspect of the invention comprises an electronic camera, which has electronic image pick-up processing means for photographing a subject and producing image data representing an image of the photographed subject, and a computer system provided separately of the electronic camera and connected thereto by a communication line.

The computer system includes control-parameter setting means for setting control parameters for photography of the subject by the electronic image pick-up processing means of the electronic camera, photographic-command input means for starting photography of the subject by the electronic image pick-up processing means of the electronic camera, transmission-command input means for commanding that the image data produced by the electronic image pick-up processing means of the electronic camera is to be transmitted, and means for transmitting, to the electronic camera, the control parameters set by the control-parameter setting means, the photographic command inputted by the photographic-command input means and the transmission command inputted by the transmission-command input means.

The electronic camera includes means for adjusting operating conditions of image pick-up processing performed by the electronic image pick-up processing means, photography-start control means for performing control in such a manner that the electronic image pick-up processing means starts image pick-up processing of the image of the subject in response to the photographic command that has been transmitted from the computer system, and means for transmitting the image data, which has been produced by the electronic image pick-up processing means, to the computer system in response to the transmission command transmitted from the computer system.

The present invention according to the second aspect thereof further provides a method of controlling the above-mentioned imaging system, the electronic camera and computer system which construct the imaging system, and methods of controlling the electronic camera and computer system.

The electronic camera lacks a shutter release switch and control-parameter setting unit operated by a human being.

In accordance with the invention, control parameters are set in the computer system and the set control parameters are transmitted to the electronic camera. The operating conditions conforming to the control parameters are adjusted in the electronic camera. When the photographic command is inputted in the computer system, the inputted photographic command is transmitted to the electronic camera, where photographic processing is executed. The image data representing the image of the subject photographed is transmitted to the computer system.

Thus, the control parameters which represent the photographic conditions of the electronic camera can be set in the computer system. As a result, all of the photographic operations in the electronic camera can be performed by the computer system.

An imaging system according to a third aspect of the invention comprises an electronic camera, which has electronic image pick-up processing means for photographing a subject and producing image data representing an image of the photographed subject, and a computer system capable of communicating with the electronic camera.

The electronic image pick-up processing means of the electronic camera includes means for detecting a present controlled variable for photographic processing, means for controlling feedback in such a manner that the detected controlled variable will agree with a given target value, automatic control means for deciding a target value, which is based upon information obtained from the subject or set information, in an automatic control mode, and applying the decided target value to the feedback control means, and control means for starting the automatic control means when an automatic control command has been applied from the computer system, and transmitting the present controlled variable detected by the detecting means to the computer system, and thereafter applying the target value, which will be transmitted from the computer system, to the feedback control means, when a manual control command has been applied.

The computer system includes means for setting one of the automatic control mode and manual control mode, means for issuing, and transmitting to the electronic camera, the automatic control command when the automatic control mode has been set and the manual control command when the manual control mode has been set, means for displaying the present controlled variable transmitted from the electronic camera in response to the manual control command when the manual control command has been issued, means for setting a target value in the manual control mode, and means for transmitting the set target value to the electronic camera.

The present invention according to the third aspect thereof further provides a method of controlling the above-mentioned imaging system, the electronic camera and computer system which construct the imaging system, and methods of controlling the electronic camera and computer system.

The amount of exposure, white balance, black balance, focusing and amount of zoom can be cited as camera control parameters subjected to feedback control by the automatic control means.

In control of amount of exposure, for instance, the brightness of the subject is measured. The value of f-stop and the shutter speed (which correspond to target values) are decided based upon the photometric value obtained by above-mentioned measurement. The presently prevailing f-stop value (which corresponds to the present controlled variable) is detected, and feedback control is performed in the electronic camera in such a manner that the f-stop value will attain the target f-stop value. In the manual control mode, the f-stop value detected by the electronic camera is transmitted to the computer system, where the value is displayed. The user observes this display and is capable of setting the f-stop value, which serves as the target, in the computer system. The target f-stop value set in the computer system is transmitted to the electronic camera, where the above-mentioned feedback control is executed.

An automatic mode and a remote mode in a preferred embodiment of the invention, described below, correspond to the automatic control mode and manual control mode, respectively, of the invention.

In accordance with the present invention, a manual control command is transmitted to the electronic camera when the manual control mode is set in the computer system. The electronic camera responds by transmitting the present controlled variable of a control parameter to the computer system. The received controlled variable is displayed in the computer system. Accordingly, the user of the imaging system observes the displayed controlled variable and is capable of determining whether it is necessary to change or set the target value of the control parameter. By employing the present controlled variable in the camera as a reference, the user is capable of deciding the target value of the control parameter. The user can set the target value of the control parameter of the electronic camera in the computer system, and the target value set in the computer system is transmitted to the electronic camera. In response, the present controlled variable of the control parameter is subjected to feedback control in the electronic camera so as to be brought into agreement with the target value.

An imaging system according to a fourth aspect of the present invention comprises an electronic camera for adjusting control parameters of an imaging optical system in conformity with a given command, photographing a subject using the imaging optical system and producing image data representing an image of the photographed subject, and a computer system capable of communicating with the electronic camera and taking the initiative in the communication with the electronic camera.

In a first embodiment of this aspect of the invention, the computer system has means for setting a target value relating to a control parameter of the imaging optical system, and transmitting means for transmitting the set target value to the electronic camera along with a setting command.

The electronic camera includes means for periodically detecting a controlled variable relating to the control parameter of the imaging optical system, target-value memory means for storing the applied target value relating to the control parameter of the imaging optical system, means for performing feedback control in such a manner that the controlled variable detected by the detecting means will agree with a given target value, comparing means for periodically comparing the detected controlled variable relating to the imaging optical system with the stored target value, comparison-value memory means for storing results of comparison performed by the comparing means, means for transmitting, to the computer system, the results of comparison stored by the comparison-value memory means, and control means responsive to transmission of the target value along with the setting command from the computer system for performing control so as to read the results of comparison stored in the comparison-value memory means immediately before said transmission, store the target value transmitted from the computer system in the target-value memory means as a new target value if the results of comparison indicate agreement, transmit the fact of agreement to the computer system, using the transmitting means, as a response to the setting command and carry out feedback control using the feedback control means in such a manner that the controlled variable relating to the control parameter of the imaging optical system will become the newly stored target value, wherein if the results of comparison indicate non-agreement, the control means performs control so as to transmit this fact to the computer system using the transmitting means.

In a second embodiment of this aspect of the invention, the computer system includes means for setting a notification mode for notifying of a present controlled variable relating to a control parameter of the imaging optical system, and transmitting means for transmitting a controlled-variable transmission command to the electronic camera when the notification mode has been set.

The electronic camera in this embodiment includes means for periodically detecting a controlled variable relating to the control parameter of the imaging optical system, means for storing the applied target value relating to the control parameter of the imaging optical system, comparing means for periodically comparing the detected controlled variable relating to the control parameter of the imaging optical system with the stored target value, means for transmitting to the computer system, the results of the comparison by the comparing means and the target value relating to the imaging optical system, and control means responsive to transmission of the controlled-variable transmission command from the computer system for performing control so as to read the results of comparison performed by the comparing means immediately before said transmission, and transmit to the computer system, as a response to the controlled-variable transmission command, and using the transmitting means, the controlled variable detected by the detecting means immediately before receipt of the controlled-variable transmission command if the results of comparison indicate agreement, wherein if the results of comparison indicate non-agreement, the control means performs control so as to transmit this fact to the computer system, using the transmitting means, as a response to the controlled-variable transmission command.

The present invention according to the fourth aspect thereof further provides a method of controlling the above-mentioned imaging system, the electronic camera which constructs the imaging system, and a method of controlling the electronic camera.

In accordance with the present invention, a target value stored in the electronic camera and the present controlled variable detected are compared. If the electronic camera is being controlled accurately, the target value and the detected controlled variable should agree.

In accordance with the first embodiment of this aspect of the invention, a target value set in the computer system is transmitted to the electronic camera together with a setting command. When the target value is received in the electronic camera, the results of comparison are read. If agreement is obtained, the memory means is rewritten and the imaging optical system is subjected to feedback control in such a manner that the newly stored target value will be attained. If the results of the comparison show agreement, this fact is transmitted to the computer system. In the case of non-agreement such fact is also transferred to the computer system.

In accordance with the second embodiment of this aspect of the invention, a notification control command set in the computer system is transmitted to the electronic camera. When the notification control command is received in the electronics camera, the results of comparison are read. If the resultsof comparison agree, the present controlled variable that has been stored is transmitted to the computer system. If the results of comparison indicate non-agreement, this fact is transmitted to the computer system.

Thus, the target value and the controlled variable are compared, and the results of comparison are transmitted to the computer system. Accordingly, even if the operation for performing photography is carried out in the computer system, whether or not the electronic camera is being controlled correctly can be grasped with comparative ease.

Further, since control commands are sent solely from the computer system, control of overall operation also is made comparatively simple.

An electronic still-video camera according to a fifth aspect of the present invention comprises a solidstate electronic image sensing device for picking up an image of a subject, time setting means in which there are predetermined a first time period from a prescribed reference time following a photographic command to start of exposure, a second time period from the reference time to start of processing for erasing a spurious signal produced in the solid-state electronic image sensing device, and a third time period from the reference time to start of readout of a signal charge stored in the solid-state electronic image sensing device by photography, spurious-signal erasing means for performing erasing processing to erase a spurious signal, driving means for driving the solid-state electronic image sensing device, photographic command means for applying the photographic command, control means responsive to the photographic command applied by the photographic command means for performing control in such a manner that exposure of the solid-state electronic image sensing device is started when the first time period has elapsed from the reference time, erasing processing for erasing the spurious signal by the spurious-signal erasing means is started when the second time period has elapsed, and readout processing for reading out the signal charge is started using the driving means when the third time period has elapsed, and recording means for recbrding, on a recording medium, a video signal representing the image of the subject obtained by the readout processing for reading out the signal charge.

The present invention further provides a method of controlling the above-described electronic still-video camera.

In accordance with the fifth aspect of the invention, the photographic command is provided by the operator of the electronic still-video camera, whereupon exposure, erasure of spurious signals and signal-charge readout are performed after respective fixed time periods so that recording may be performed on the recording medium. When the photographic command is applied, exposure, processing for erasing spurious signals and signal-charge readout are performed automatically after respective fixed time periods, and the image of the subject is recorded. Accordingly, the number of control lines for recording can be reduced.

An electronic still-video camera according to a sixth embodiment of the invention comprises a solid-state electronic image sensing device composed of a number of photoelectric transducers arranged in row and column directions, time setting means in which there are predetermined a first time period from a prescribed reference time following a recording command to start of photography for recording, a second time period from the reference time to start of processing for erasing a spurious signal produced in the solid-state electronic image sensing device, and a third time period from the reference time to start of readout of a signal charge stored in the solid-state electronic image sensing device by photography for recording, spurious-signal erasing means for performing erasing processing to erase a spurious signal, driving means for driving the solid-state electronic image sensing device, recording command means for applying the recording command, first control means for controlling the driving means in such a manner that the signal charge that has been obtained by photography of the subject using the solid-state electronic image sensing device and stored in the photoelectric transducers is read out as a first field signal with regard to the photoelectric transducers of a (4n+1)-th row (where n is 0 or a positive integer) or (4n+2)-th row when the recording command is not being applied by the recording command means, and is read out as a second field signal with regard to the photoelectric transducers of a (4n+3)-th row or (4n+4)-th row after the end of readout of the first field signal, whereby one frame of a video signal composed of the first field signal and the second field signal is obtained, and photography and the above-mentioned readout are repeated at a fixed period, second control means responsive to the recording command applied by the recording command means for performing control in such a manner that photography for recording is started when the first time period has elapsed and erasing processing for erasing the spurious signal by the spurious-signal erasing means is started when the second time period has elapsed, third control means responsive to the recording command applied by the recording command means for performing control in such a manner that a signal representing the signal charge stored in the photoelectric transducers of the (4n+1)-th row starts to be read out as the first field signal when the third time period has elapsed, a signal representing the signal charge stored in the photoelectric transducers of the (4n+2)-th row starts to be read out as the second field signal after the end of readout of the first field signal, a signal representing the signal charge stored in the photoelectric transducers of the (4n+3)-th row starts to be read out as the third field signal after the end of readout of the second field signal, and a signal representing the signal charge stored in the photoelectric transducers of the (4n+4)-th row starts to be read out as the fourth field signal after the end of readout of the third field signal, and recording means for recording one frame of the video signal, which is composed of the first through fourth fields that have been read out, on the recording medium.

The present invention further provides a method of controlling the above-described electronic still-video camera.

The driving means applies a readout clock signal to the solid-state electronic image sensing device in such a manner that the signal charge stored in every other column of the photoelectric transducers in each row is read out when one frame of the video signal composed of the first and second field signals, for example, is obtained, and applies a high-speed readout clock signal to the solid-state electronic image sensing device in such a manner that the signal charge stored in all columns of the photoelectric transducers in each row is read out when one frame of the video signal composed of the first through fourth field signals is obtained.

In accordance with the sixth aspect of the present invention, one frame of the video signal in which one frame is composed of the first through fourth field signals is recorded on the recording medium when recording is performed on the recording medium. Accordingly, a video signal having a high resolution can be recorded on the recording medium.

Erasing processing for erasing spurious signals is a concept which covers processing for sweeping out smear charge.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 1:
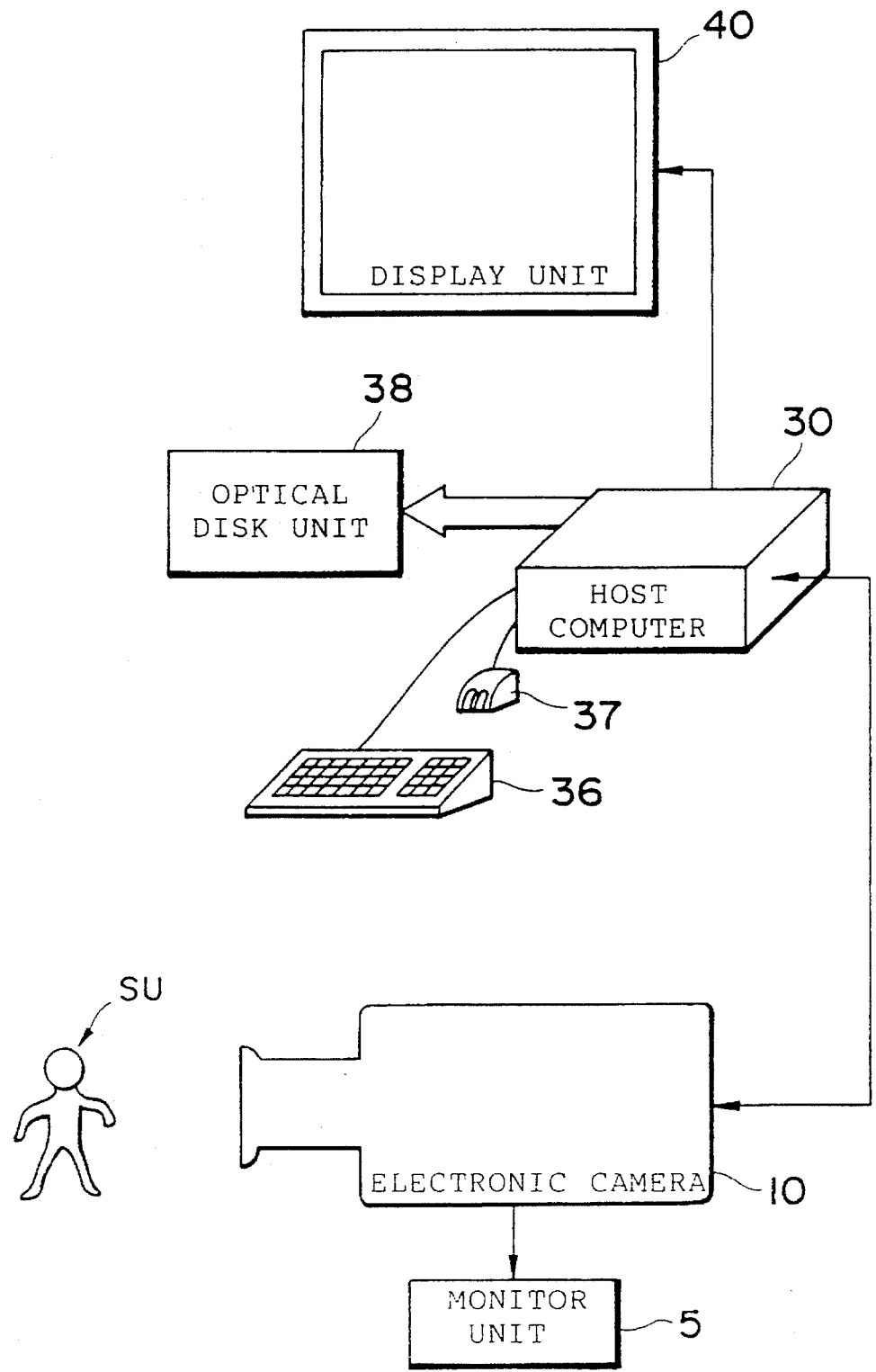
FIG. 1 is a diagram showing the overall configuration of an imaging system.

FIG. 1 illustrates the configuration of an imaging system according to an embodiment of the present invention.

An imaging system according to the present invention includes an electronic camera 10 which photographs a subject SU and produces image data representing the image of the subject, and a host computer 30 connected to the electronic camera 10 by a communication line. The electronic camera 10 is a digital electronic still-video camera, by way of example. The electronic camera 10 is not provided with a shutter release switch nor with a control-parameter setting unit for setting black balance, white balance, etc.

A monitor display unit 5 for displaying the image of the subject is connected to the electronic camera 10. The monitor display unit 5 may be a viewfinder integrated with the electronic camera 10.

Connected to the host computer 30 is a display unit 40 on which are displayed the image of the subject photographed using the electronic camera 10, camera control parameters, described below in detail, a capture command, etc. Also connected to the host computer 30 are a keyboard 36 and a mouse 37 serving as input units, as well as an optical disk unit 38 for recording image data.

Figure 2:
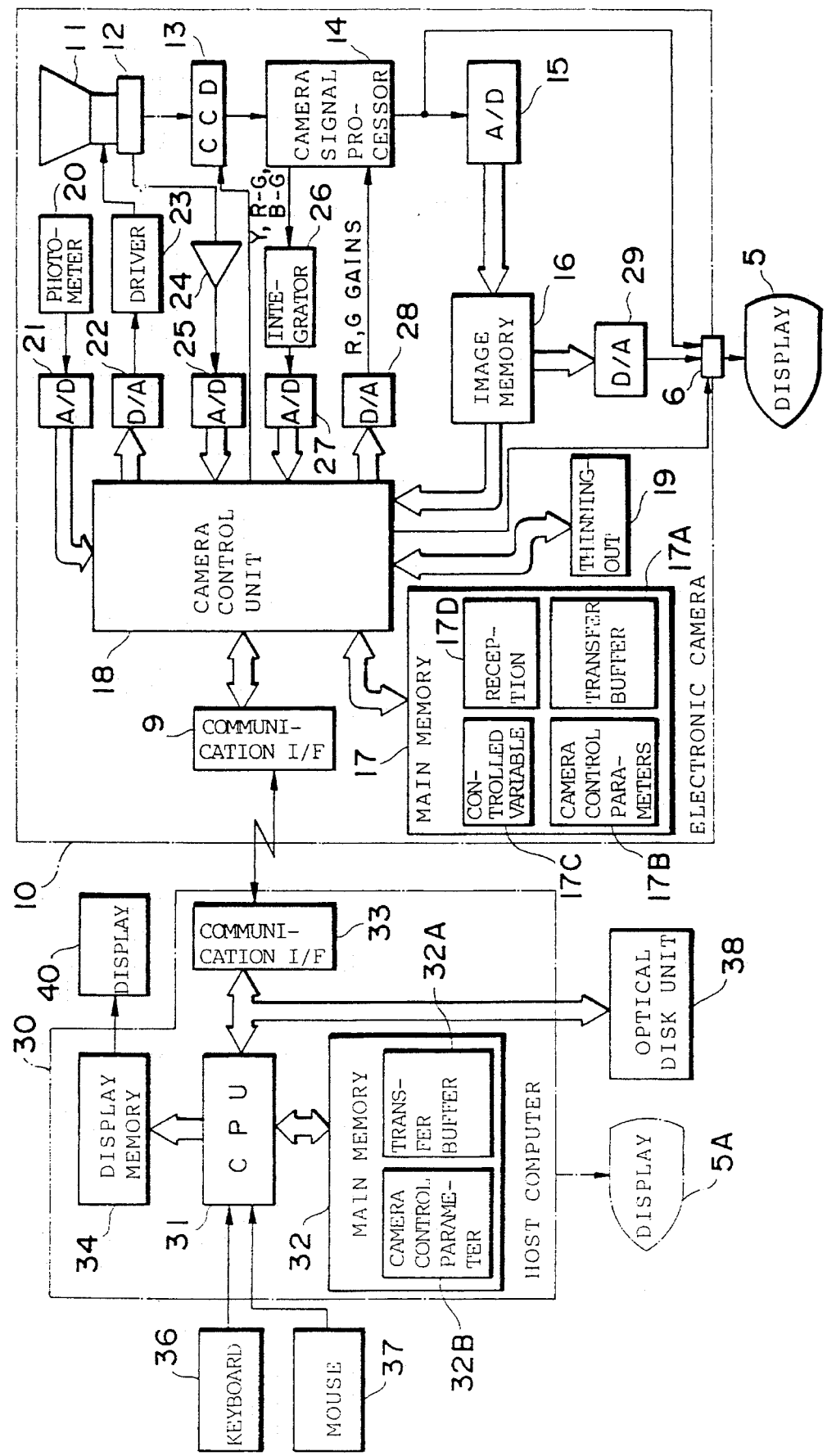
FIG. 2 is a block diagram showing the electrical construction of the imaging system.

FIG. 2 is a block diagram illustrating the electrical construction of the imaging system shown in FIG. 1.

The photographic operation of the electronic camera 10, the treatment of the image data in the electronic camera 10 and transmission processing are under the overall supervision of a camera control unit 18, which operates based upon commands transmitted from the host computer 30. The electronic camera 10 contains a communication interface 9 for receiving commands sent from the host computer 30 and transmitting image data to the host computer 30. The camera control unit 18 is composed of a CPU and its periphery circuitry.

The electronic camera 10 includes an imaging optical system having a zoom-lens mechanism 11 and a diaphragm 12 for forming the image of the subject, a CCD 13 arranged at the image-forming position of the image of the subject for outputting a video signal which represents the image of the subject photographed, and a signal processing circuit 14 for obtaining an RGB signal by subjecting the video signal from the CCD 13 to color separation, white-balance adjustment, black-balance adjustment, etc.

The electronic camera 10 further includes a digital/analog (D/A) converting circuit 22 and a driver 23 for adjusting the amount of zoom of the zoom-lens mechanism 11 and controlling the diaphragm 12. The camera control unit 18 outputs control data regarding the amount of zoom and control data for controlling the diaphragm, and the driver 23 is driven via the D/A converting circuit 22 so that the amount of zoom and the diaphragm are adjusted. In order to simplify the drawing, only one set of the D/A converting circuit 22 and driver 23 is illustrated. However, it goes without saying that one set is provided for adjusting the amount of zoom and one set for adjusting the diaphragm. The same holds true in the description that follows.

The signal processing (color separation, adjustment of white balance and black balance) in signal processing circuit 14 also is carried out by the camera control unit 18. The electronic camera 10 includes a D/A converting circuit 28 for converting the digital control data regarding signal processing outputted by the camera control unit 18 into an analog control signal and applying the analog control signal to the signal processing circuit 14.

The electronic camera 10 further includes a photometric element 20. A signal representing the amount of received light is outputted by the photometric element 20. This signal is applied to an analog/digital (A/D) converting circuit 21, which converts the signal into digital data and applies this data to the camera control unit 18. The data regarding the amount of received light, which data is obtained from the photometric element 20, is utilized for the control of the diaphragm and for white-balance adjustment and black-balance adjustment in the signal processing circuit 14.

Also included in the electronic camera 10 are an amplifier 24 and an A/D converting circuit 25 in order that the amount of zoom and f-stop in the zoom-lens mechanism 11 may be ascertained in the camera control unit 18. Data indicative of the amount of zoom and f-stop is applied to the camera control unit 18 via the amplifier 24 and A/D converting circuit 25.

Also included are an integrating circuit 26 and an A/D converting circuit 27 in order that the amounts of white balance and black balance in the signal processing circuit 14 may be ascertained in the camera control unit 18. The integrating circuit 26 integrates a luminance signal Y and color-difference signals R-G, B-G, which are obtained from the signal processing circuit 14, and applies the integrated signals to the camera control unit 18 via the A/D converting circuit 27. As a result, the amounts of white balance and black balance are ascertained in the camera control unit 18.

The amount of zoom, the f-stop value and the values of white and black balance undergo feedback control under the control of the camera control unit 18.

The camera control unit 18 performs so-called electronic-shutter control (control of shot timing and shutter speed) in the CCD 13.

The electronic camera 10 further includes an analog/digital (A/D) converting circuit 15 for converting the RGB signal outputted by the signal processing circuit 14 into digital image data, an image memory 16 for storing the digital image data converted in the A/D converting circuit 15, a thinning-out circuit 19 for thinning out pixels represented by the image data, and a main memory 17. The main memory 17 is provided with a transfer buffer 17A for temporarily storing image data to be transmitted to the host computer 30, a camera control-parameter memory 17B which stores camera control parameters for shutter control and adjustment of white balance and black balance, a controlled-variable memory 17C in which a presently prevailing controlled variable is stored, and a reception buffer 17D for temporarily storing camera control parameters transmitted from the host computer 30. The image memory 16 has a capacity capable of storing at least one frame of image data.

The electronic camera 10 further includes a D/A converting circuit 29 which converts the digital image data into an analog video signal in order to display the image of the photographed subject on the monitor display unit 5.

The host computer 30 includes a CPU 31, by which the overall operation of the host computer 30 is supervised. The CPU 31 creates various data and commands, described later, based upon input signals applied thereto from the keyboard 36 and mouse 37 connected to the host computer 30.

The host computer 30 includes a communication interface 33. Transmission of the data and commands, which have been created by the CPU 31, to the electronic camera 10, and reception of image data transmitted from the electronic camera 10, are carried out through the communication interface 33.

The host computer 30 further includes a main memory 32 and a display memory 34. The main memory 32 is provided with a transfer buffer 32A which stores image data transmitted from the electronic camera 10, and a camera control-parameter memory 32 for storing camera control parameters, such as amount of exposure, black balance and white balance, set on the screen of the display unit 40 by the keyboard 36 or mouse 37. The display memory 34 stores data representing the image, characters and symbols displayed on the display unit 40.

Connected to the host computer 30 is an optical disk unit 38, in which the image data is recorded on an optical disk.

As indicated by the phantom line in FIG. 2, the host computer 30 may be provided with a monitor display unit 5A which, by being connected directly to the electronic camera 10, allows the image of the subject photographed by the electronic camera 10 to be displayed on the monitor display unit 5A so that the image can be observed while the host computer 30 is being operated.

Figure 3:
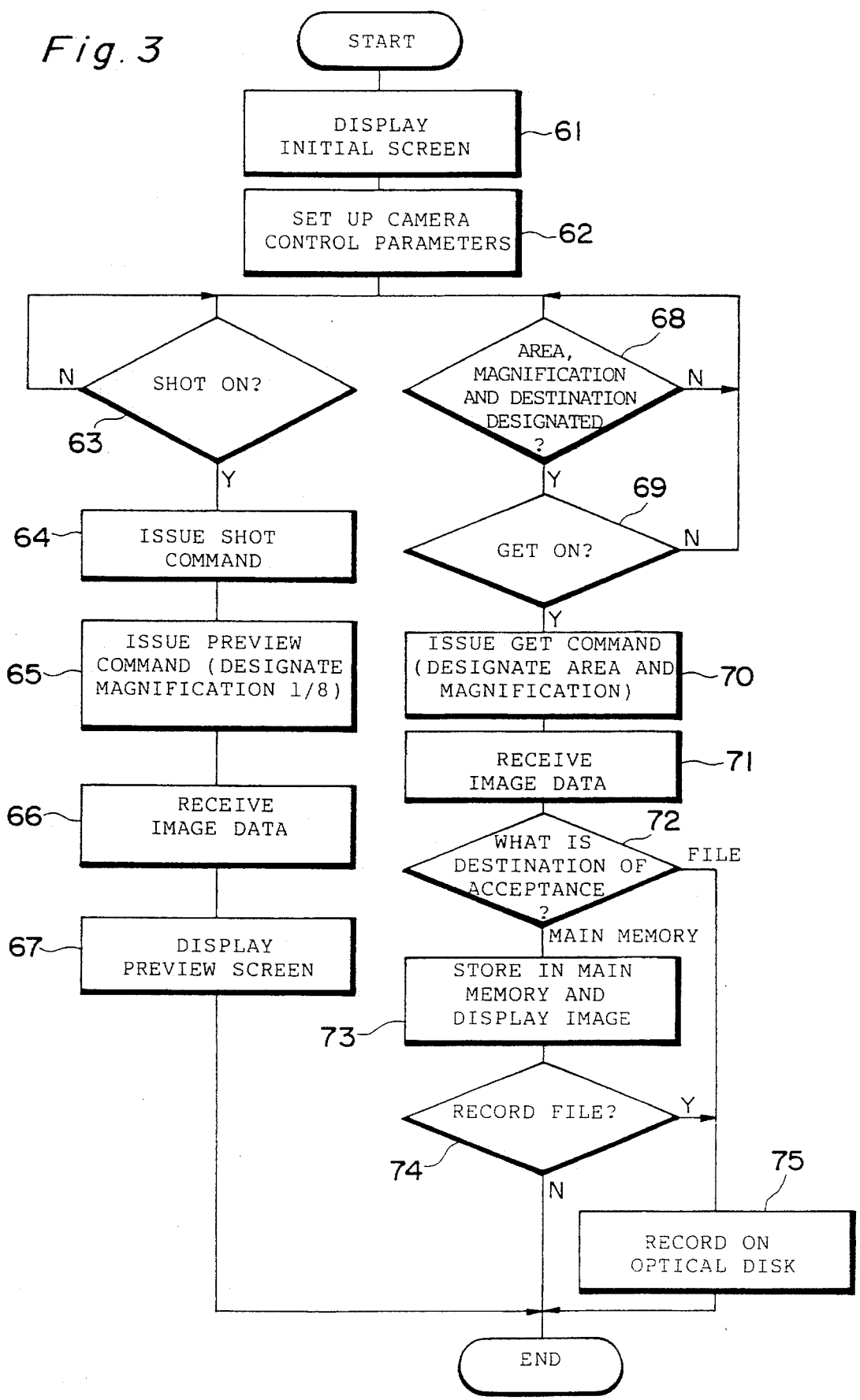
FIG. 3 is a flowchart showing a processing procedure in a host computer.
Figure 4:
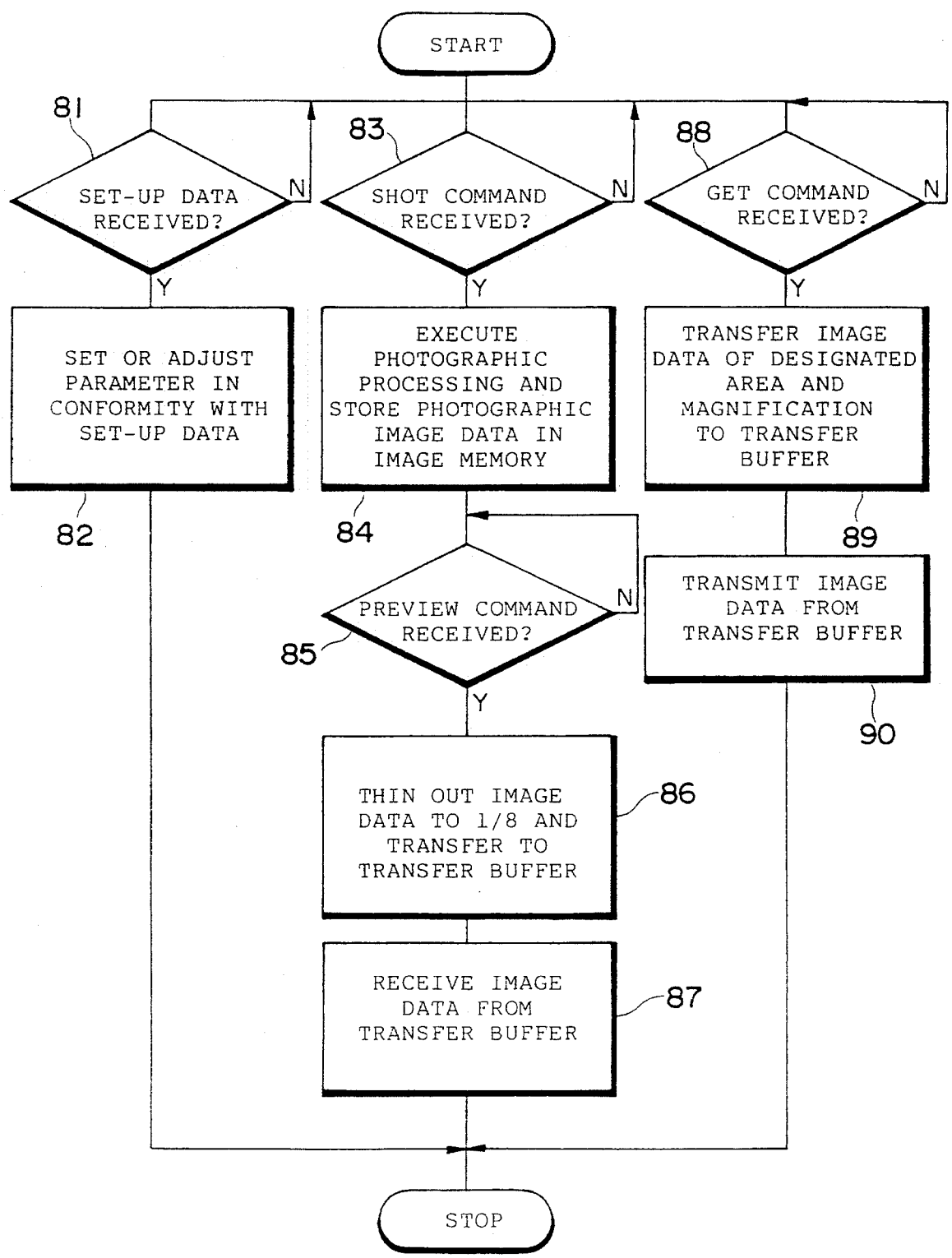
FIG. 4 is a flowchart showing a processing procedure in an electronic camera.

FIGS. 3 and 4 are flowcharts illustrating processing procedures for image pick-up, transmission, display and recording in this imaging system. FIG. 3 is a flowchart showing a processing procedure in the host computer 30, and FIG. 4 is a flowchart showing a processing procedure in the electronic camera 10.

Figure 5:
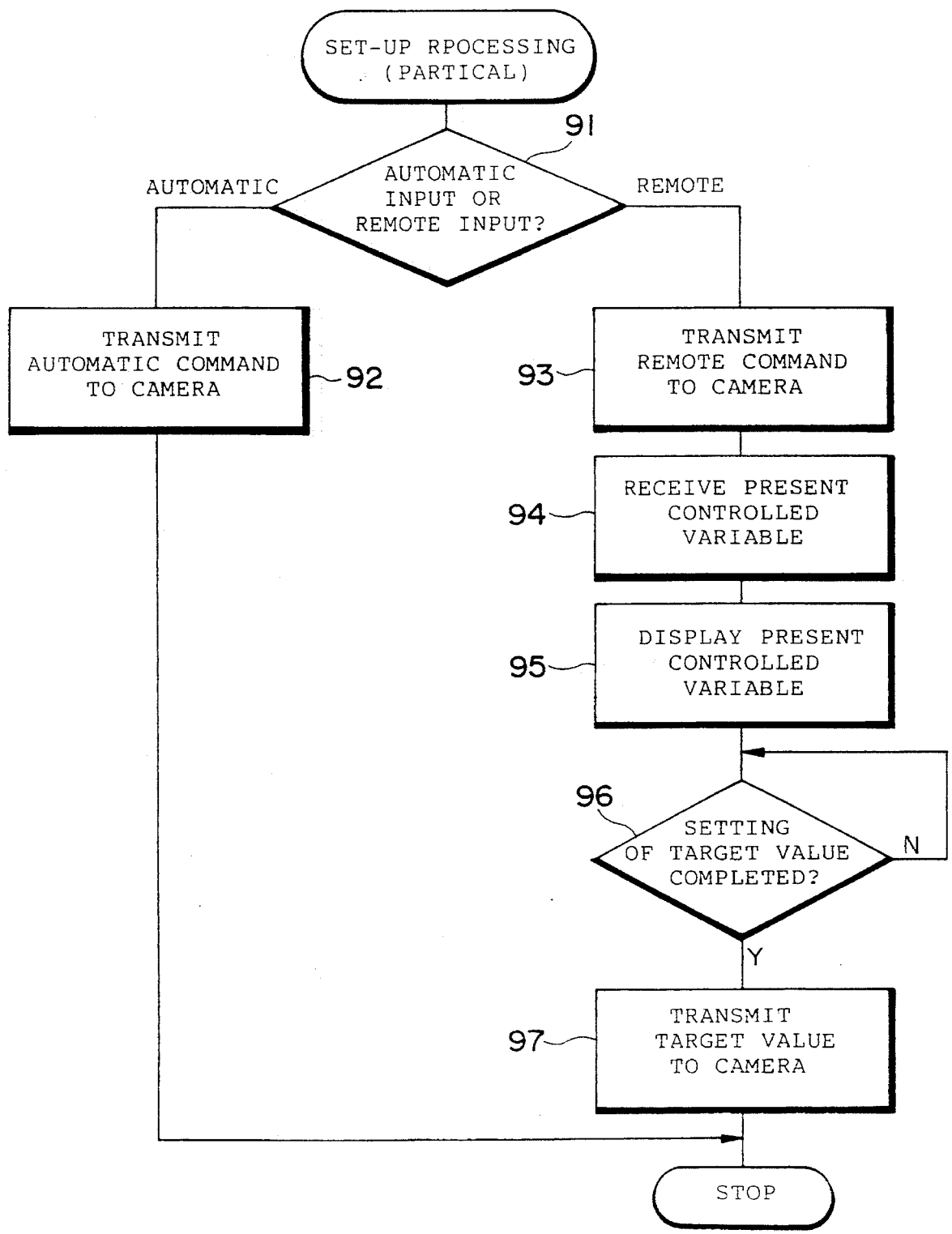
FIG. 5 is a flowchart showing part of a procedure of set-up processing.
Figure 6:
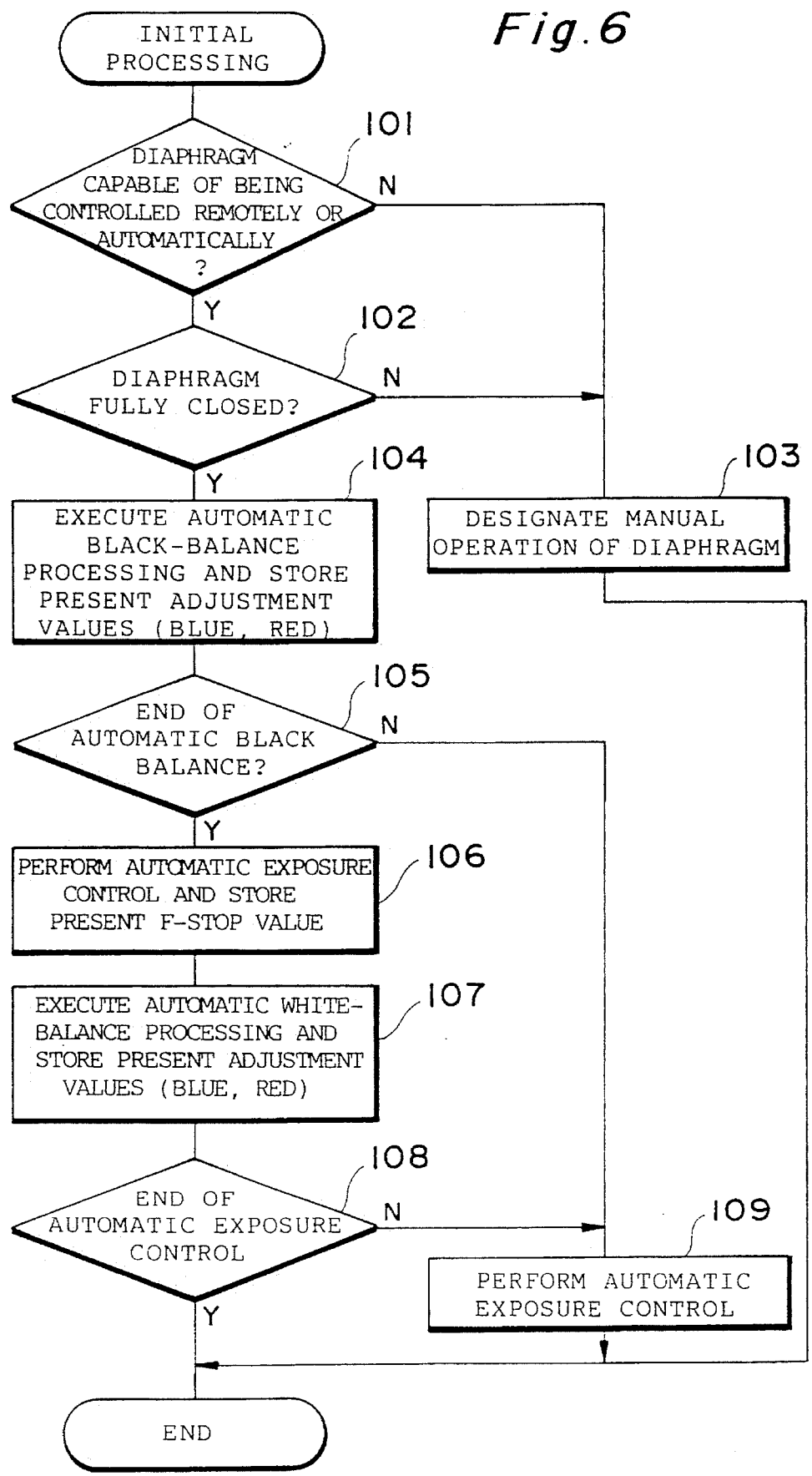
FIG. 6 is a flowchart showing the initial processing of the electronic camera.
Figure 7:
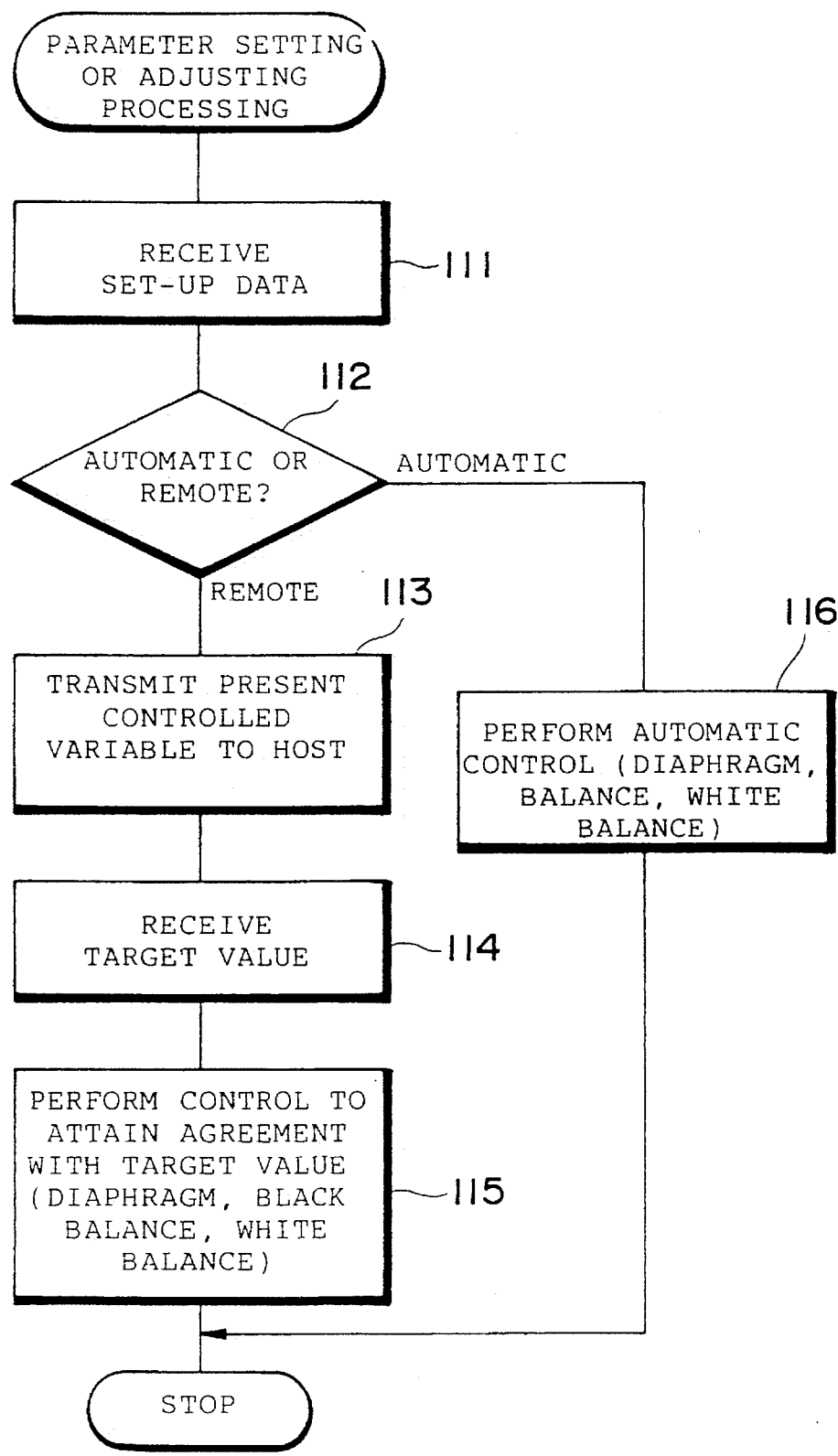
FIG. 7 is a flowchart showing a processing procedure for setting the parameters of the electronic camera.

FIG. 5 is a flowchart showing part of a procedure of set-up processing (step 62) in the host computer 30, FIG. 6 is a flowchart showing the initial processing in the electronic camera 10, and FIG. 7 is a flowchart showing processing (steps 81, 82) for setting or adjusting the camera control parameters in the electronic camera 10.

Figure 8:
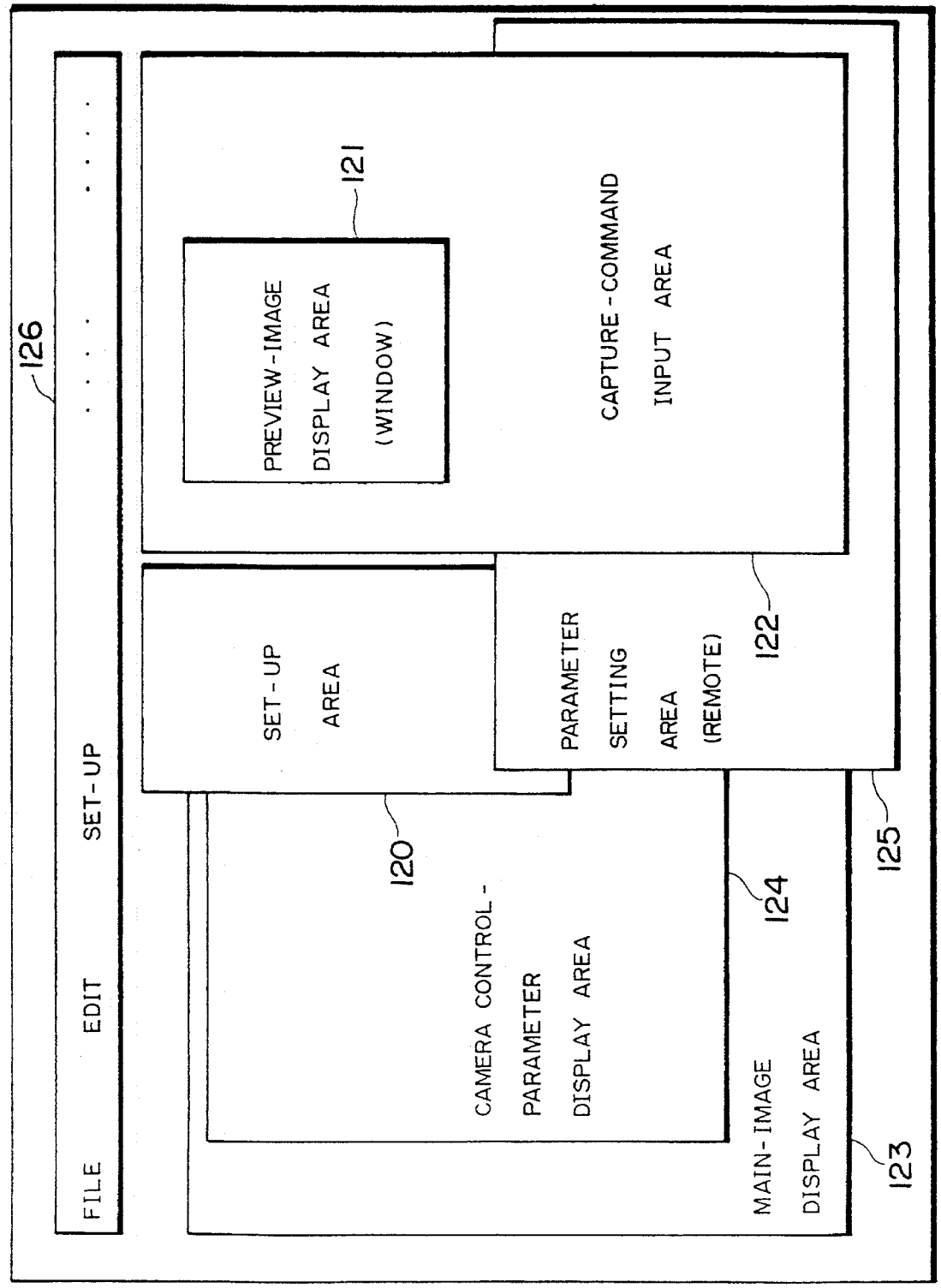
FIG. 8 is a diagram showing a plurality of display areas displayed on a display unit.
Figure 9:
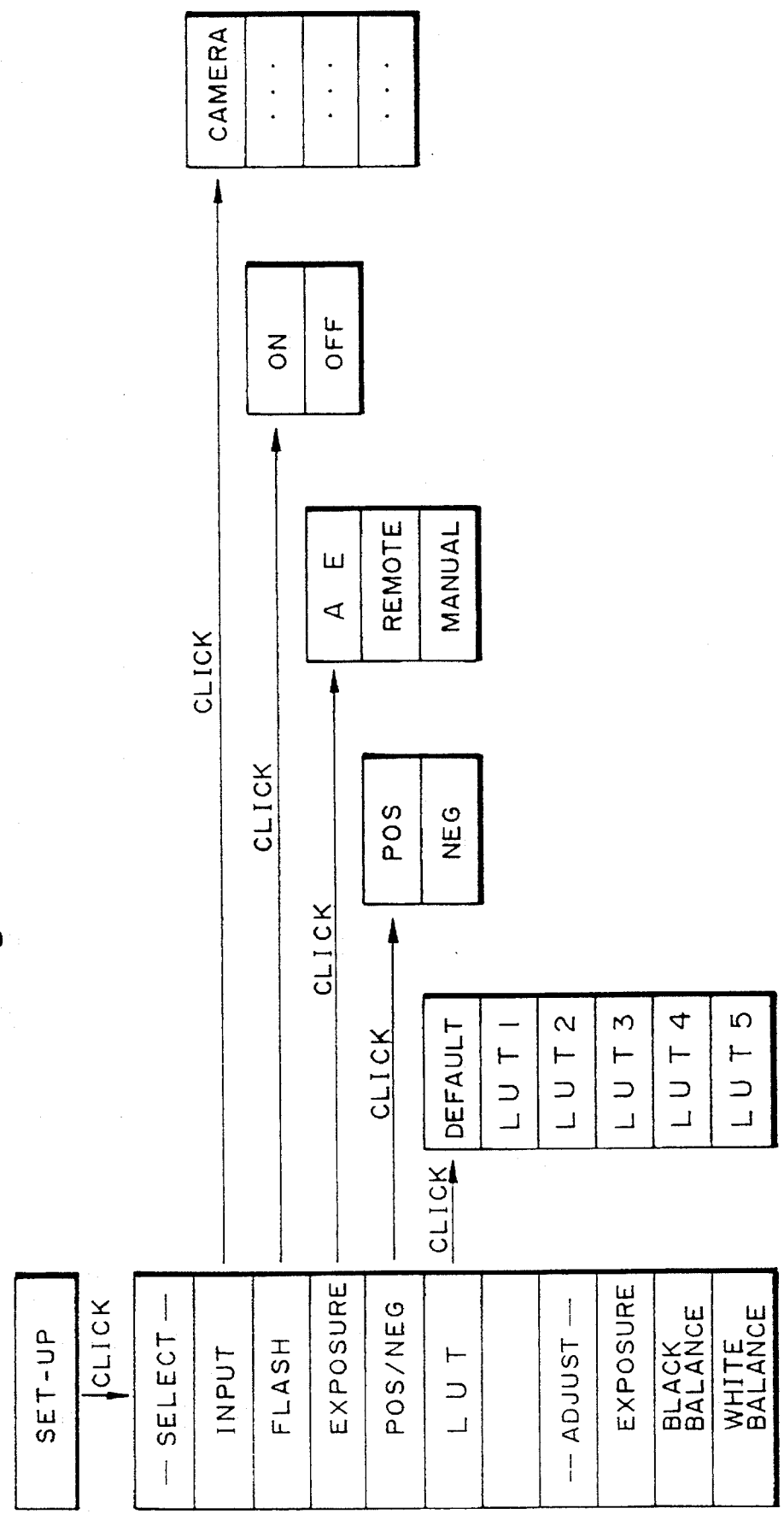
FIG. 9 is a diagram showing what is displayed in some of the areas of the display unit.

FIG. 8 is a diagram showing various areas set on the screen of the display unit 40. FIG. 9 is a diagram showing an example what is displayed in some of the areas among the various areas set on the screen of the display unit 40, and FIGS. 10 through 24 are diagrams illustrating examples of screens displayed on the display unit 40.

Initial processing is carried out when the power supply of the electronic camera 10 is turned on.

The electronic camera 10 has an automatic function for automatically setting a controlled variable (the value of a camera control parameter) of the electronic camera 10 in the camera, a remote function for making settings in the host computer 30, and a manual function by which the operator makes settings at the electronic camera 10.

First, it is determined whether the diaphragm 12 is capable of remote control or automatic control (step 101 in FIG. 6).

It is determined whether the diaphragm 12 has been completely closed by being so controlled for the sake of black-balance adjustment (step 102 in FIG. 6).

When either remote control or automatic control of the diaphragm 12 can not be performed, or when the diaphragm 12 is not completely closed, the fact that the diaphragm 12 should be set manually is displayed on the monitor display unit 5 (step 103 in FIG. 6).

When the diaphragm 12 is capable of being controlled remotely or automatically and, moreover, the diaphragm 12 has been completely closed, automatic black-balance processing is executed in accordance with the information obtained from the photometric element 20 (step 104 in FIG. 6). Presently prevailing black-balance values (values relating to blue and red) that have been set are stored in the controlled-variable memory 17C.

When automatic black-balance processing ends (YES at step 105 in FIG. 6), a target value of exposure to be set is decided based upon the photometric information obtained from the photometric element 20, and the diaphragm 12 is controlled in such a manner that the target value decided is obtained. The presently prevailing f-stop value that has been set is stored in the controlled-variable memory 17C (step 106 in FIG. 6).

Next, automatic white-balance processing is executed in accordance with the photometric information obtained from the photometric element 20 (step 107 in FIG. 6). Presently prevailing white-balance values (values relating to blue and red) that have been set are stored in the controlled-variable memory 17C.

If the automatic black-balance processing or automatic white-balance processing has not ended, the diaphragm 12 is adjusted automatically in accordance with the information obtained from the photometric element 20 (steD 109 in FIG. 6).

An initial screen is displayed on the display unit 40 when the power supply of the host computer 30 is turned on (step 61 in FIG. 3).

As illustrated in FIG. 8, various display areas are displayed on the screen of the display unit 40 as needed. The areas include a menu display area 126, a set-up area 120, a capture-command input area 122, a preview-image display area 121, a camera control-parameter display area 124, a parameter setting area 125, and a main-image display area 123. Further, though not illustrated in FIG. 8, a histogram window for displaying a pixel-level histogram of the preview image is displayed on the screen of the display unit 40 when the preview image is displayed in the preview-image display area 121. When the initial screen is in effect, the menu display area 126, set-up area 120, capture-command input area 122, preview-image display area 121 and camera control-parameter display area 124 are displayed.

A menu showing "File", "Edit", Set-Up" and the like is displayed in the menu display area 126. "File" is clicked using the mouse 37 when such processing as processing for transferring data recorded on the optical disk to the main memory 32, processing for transferring data stored in the main memory 32 to the optical disk, etc., is to be executed. "Edit" is clicked using the mouse 37 when data recorded on the optical disk is to be read out and the image represented by this data is to be displayed in a specific area on the display screen. "Set-Up" is clicked using the mouse 37 when a camera control parameter is to be set.

Set-up processing (step 62 in FIG. 3) for camera control data (controlled variables), which is started by clicking "Set-Up", will be described below with reference to FIGS. 8 through 17. Set-up of camera control parameters is carried out while the host computer 30 and electronic camera 10 communicate with each other.

The set-up items are broadly classified as "Select" and "Adjust" items, as shown in FIG. 9. The "Select" items include input, flash, exposure, positive/negative and LUT (look-up table) items. The "Adjust" items include exposure, black-balance and white-balance items. When "Set-Up" is clicked, these items are displayed in the set-up area 120.

"Input" is clicked when the source generating the input image data, the form of the data, etc., are selected. When "Input" is clicked, the items representing the generating source, the form, etc., are displayed. "Camera" (meaning the electronic camera 10) is indicated in FIG. 9 as an example of the source generating the image data. "Camera" is clicked when image data is to be accepted from the electronic camera 10.

"Flash" is for setting whether a flash light-emsission is to be made. When "Flash" is clicked, "On" and "Off" are displayed and either can be selected using the mouse 37.

With regard to adjustment of the amount of exposure, there are three types of functions, namely an automatic (AE) function through which exposure is adjusted automatically at the electronic camera 10, a remote function through which the operator sets exposure at the host computer 30, and a manual function through which the operator sets exposure at the electronic camera 10. "Exposure" is clicked when either of the above-mentioned three functions is selected. When "Exposure" in the "Select" column is clicked, "AE", "Remote" and "Manual" are displayed, and the operator is capable of selecting any of these functions using the mouse 37.

"Pos/Neg" is for selecting whether positive photography (ordinary photography) or negative photography (photography, in which the white and black levels are reversed, suited to negative-film photography) is to be performed. When "Pos/Neg" is clicked, "Pos" and "Neg" are displayed and either can be selected.

"LUT" is for setting tone characteristics. Tone characteristics capable of being adjusted are "Default" as well as "LUT1" through "LUT5". "Default" is the most general tone characteristic, and is predetermined. "LUT1" through "LUT5" indicate types of tone characteristics which the user of this photographic system is capable of deciding at will. When "LUT" is clicked, "Default" and "LUT1" through "LUT5" are displayed and any one of them can be selected.

"Exposure" in the "Adjust" column is clicked when the amount of exposure is to be set in the "Remote" mode, i.e., at the host computer 30. By clicking "Exposure", particulars suited to setting of exposure are displayed in the parameter setting area 125 on the display screen of display unit 40, and setting of exposure becomes possible at the host computer 30.

"Black Balance" is for adjusting black balance. By clicking "Black Balance", a screen suited to adjustment of black balance is displayed in the parameter setting area 125 on the display screen of display unit 40, and adjustment of black balance becomes possible at the host computer 30.

"White Balance" is for adjusting white balance. By clicking "White Balance", a screen suited to adjustment of white balance is displayed in the parameter setting area 125 on the display screen of display unit 40, and adjustment of white balance becomes possible at the host computer 30.

Figure 10:
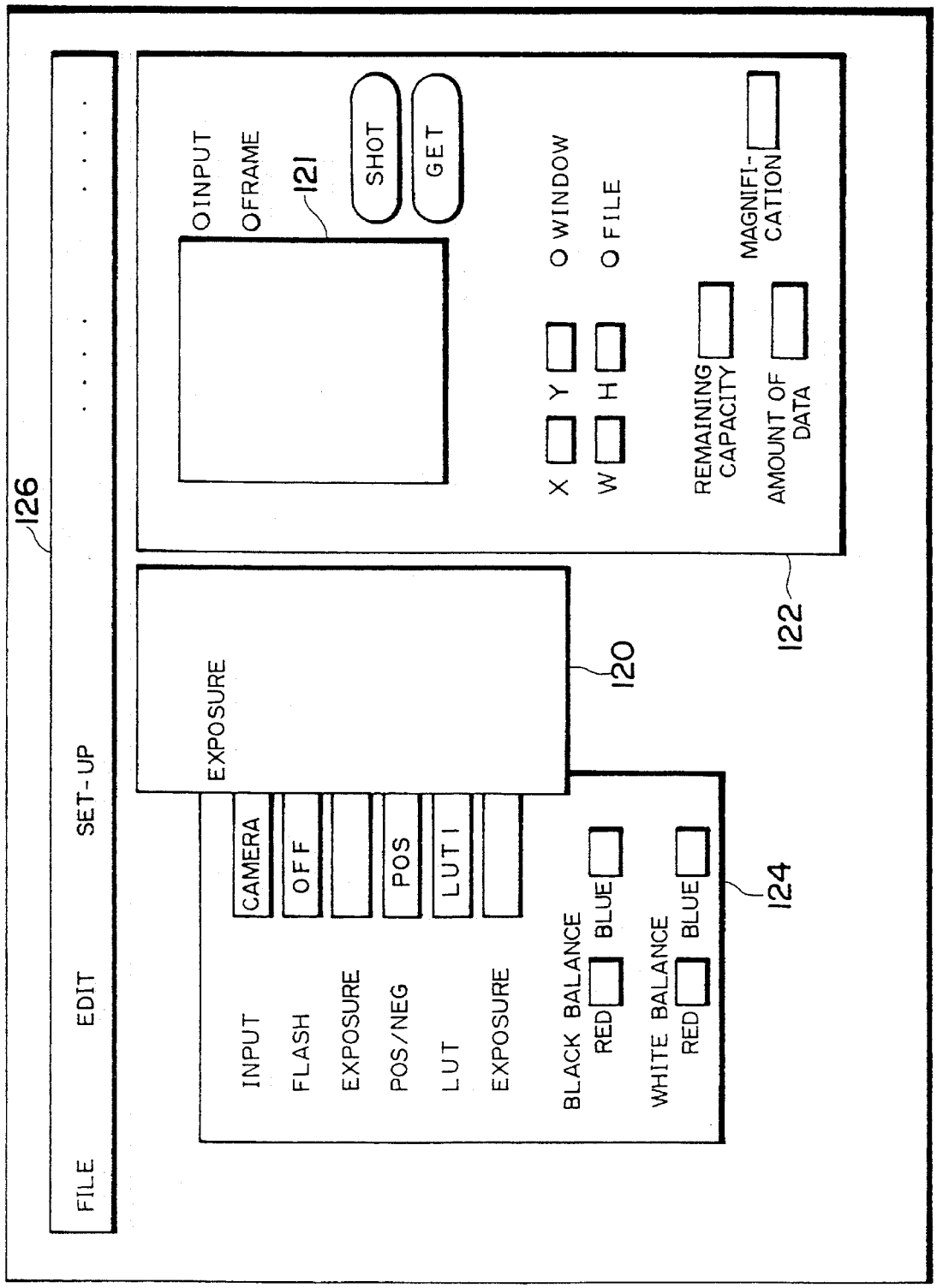
FIG. 10 is a diagram illustrating an example of a display on the display unit.

FIG. 10 illustrates an example of a display for a condition in which "Camera" has been selected with regard to "Input" in the "Select" column of the set-up items, "On" with regard to "Flash", "Pos" with regard to "Pos/Neg", and "LUT1" with regard to "LUT". The set items are displayed in the camera control-parameter display area 124. Though the five items of "Select" may be set in any order, here it is assumed that "Exposure" is set last.

Figure 11:
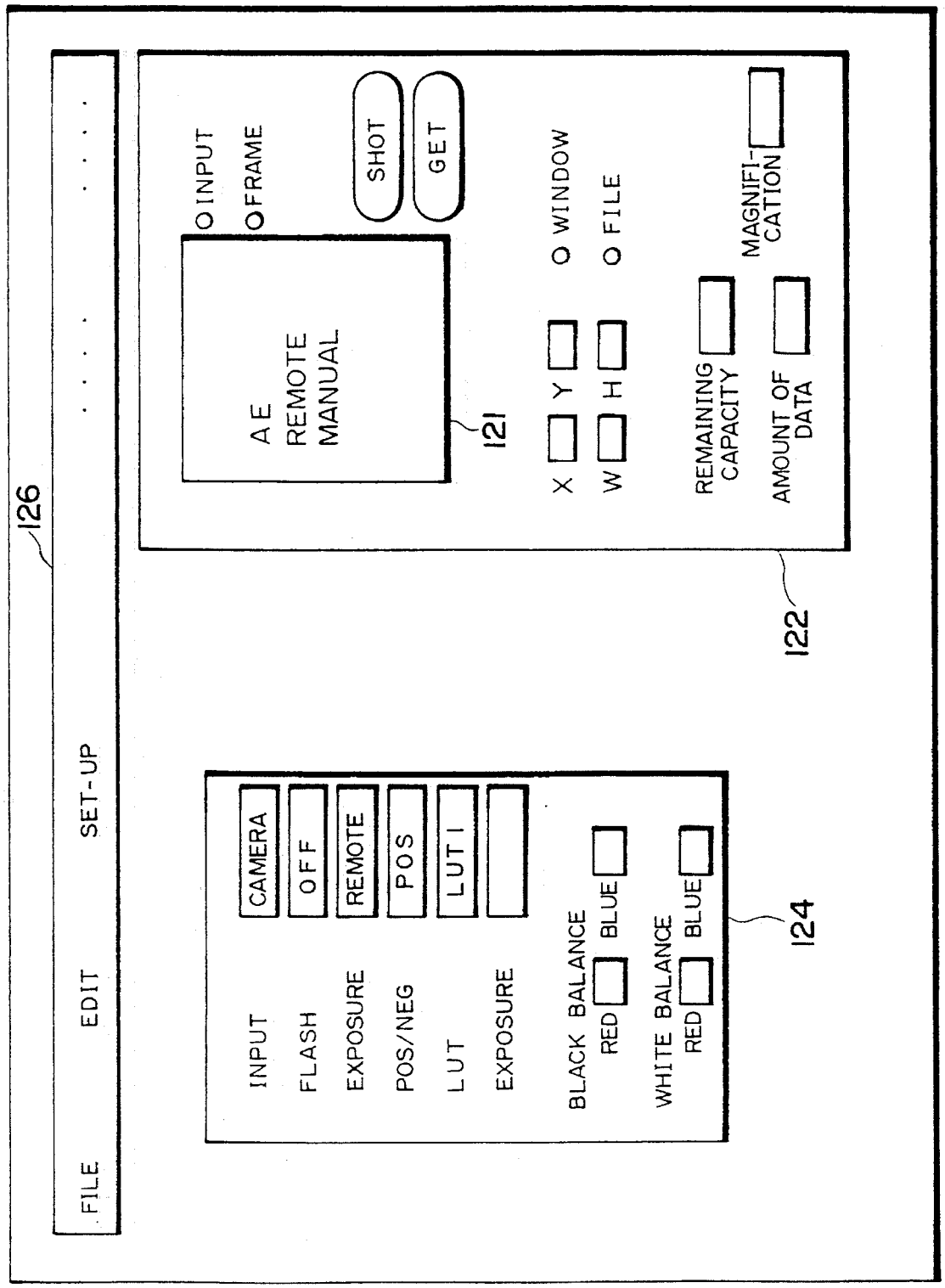
FIG. 11 is a diagram illustrating an example of a display on the display unit.

When "Exposure" in the "Select" column displayed in the set-up area 120 is clicked in order to set the "AE", "Remote" or "Manual" mode for the purpose of adjusting the amount of exposure, "AE", "Remote" and "Manual" are displayed in the preview-image display area 121, as illustrated in FIG. 11. Any of these modes can be selected using the mouse 37.

For example, if "Remote" is clicked (step 91 in FIG. 5), "Remote" is displayed in correspondence with the "Exposure" item of the camera control-parameter display area 124 and a remote command is transmitted to the electronic camera 10 (step 93 in FIG. 5) (FIG. 11). If "AE" is clicked, "AE" is displayed in correspondence with the "Exposure" item of the camera control-parameter display area 124 and an AE (automatic) command is transmitted to the electronic camera 10 (steps 91, 92 in FIG. 5).

Figure 12:
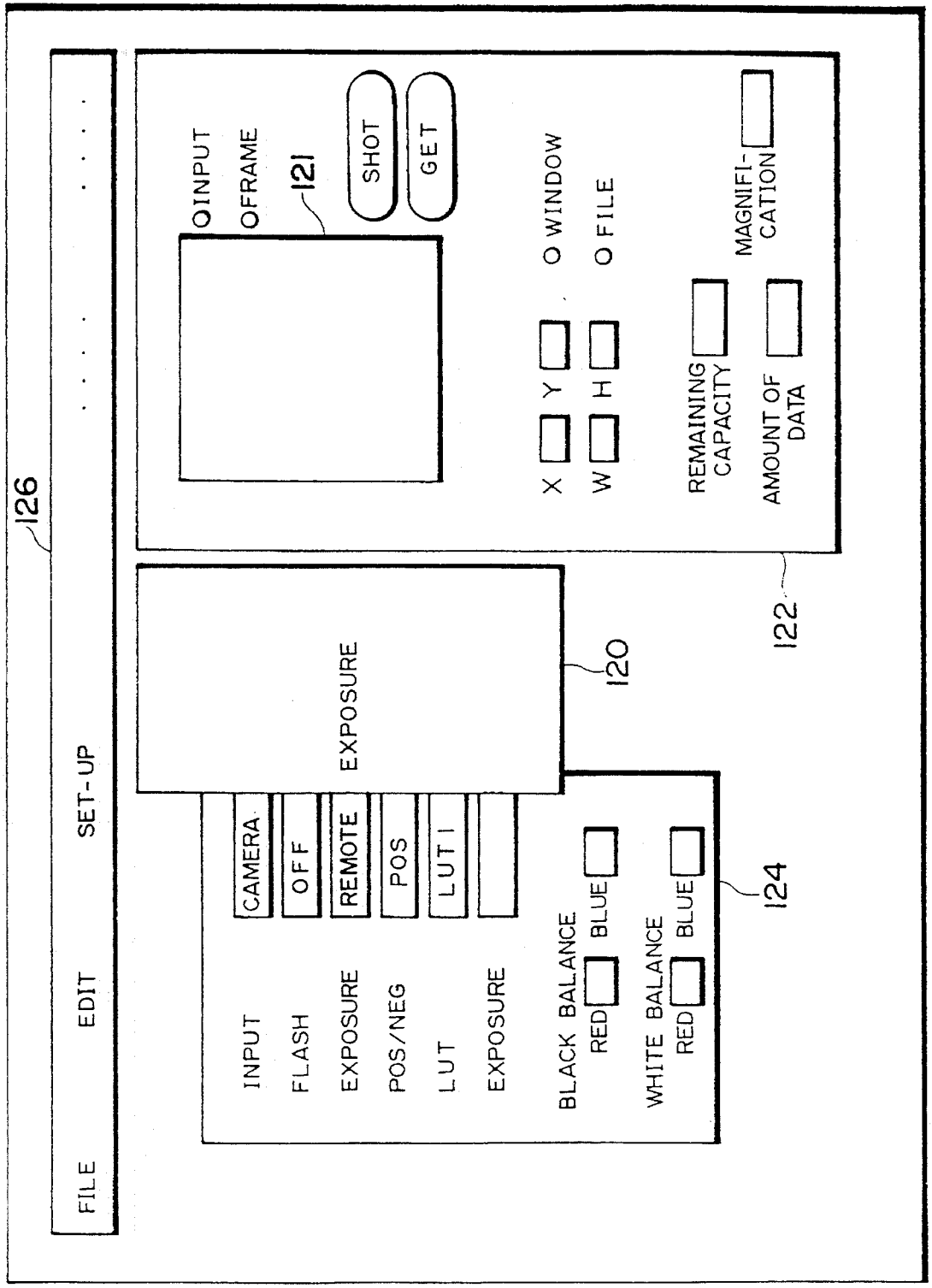
FIG. 12 is a diagram illustrating an example of a display on the display unit.
Figure 13:
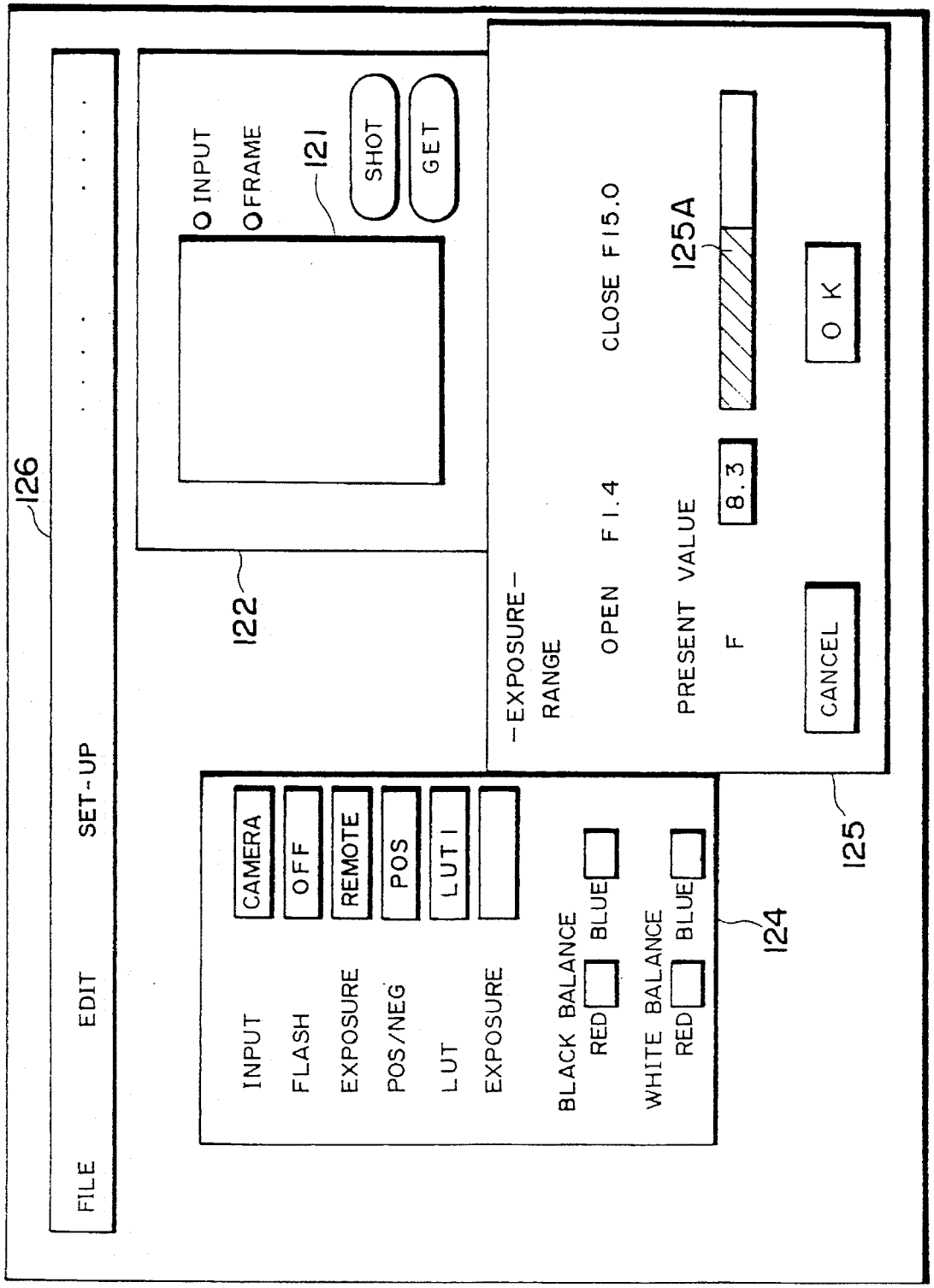
FIG. 13 is a diagram illustrating an example of a display on the display unit.

Since "Remote" is a mode in which the operator adjusts the amount of exposure at the host computer 30, as mentioned above, the operator clicks "Exposure" in the "Adjust" column, as shown in FIG. 12. When this is done, a screen suited to adjustment of the amount of exposure is displayed in the parameter setting area 125 of the display screen on the display unit 40, as depicted in FIG. 13.

In this embodiment, the amount of exposure is adjusted by the f-stop value. The shutter speed is fixed. It goes without saying that an arrangement may be adopted in which shutter speed also is capable of being set.

When the remote command is received in the electronic camera 10 (steps 111, 112 in FIG. 7), the present f-stop value (controlled variable) that has been stored in the controlled-variable memory 17C is transmitted to the host computer 30 (step 113 in FIG. 7).

The f-stop value sent from the electronic camera 10 is received in the host computer 30 (step 94 in FIG. 5).

A range of f-stop values (open f-stop value: "Open F"; fully closed f-stop value: "Closed F") and a present f-stop value ("Present Value_F") are displayed in the parameter setting area 125 shown in FIG. 13. "Present Value_F", which is the presently prevailing f-stop value of the diaphragm in the electronic camera 10, displays what has been transmitted from the electronic camera 10 to the host computer 30 (step 95 in FIG. 5).

Figure 14:
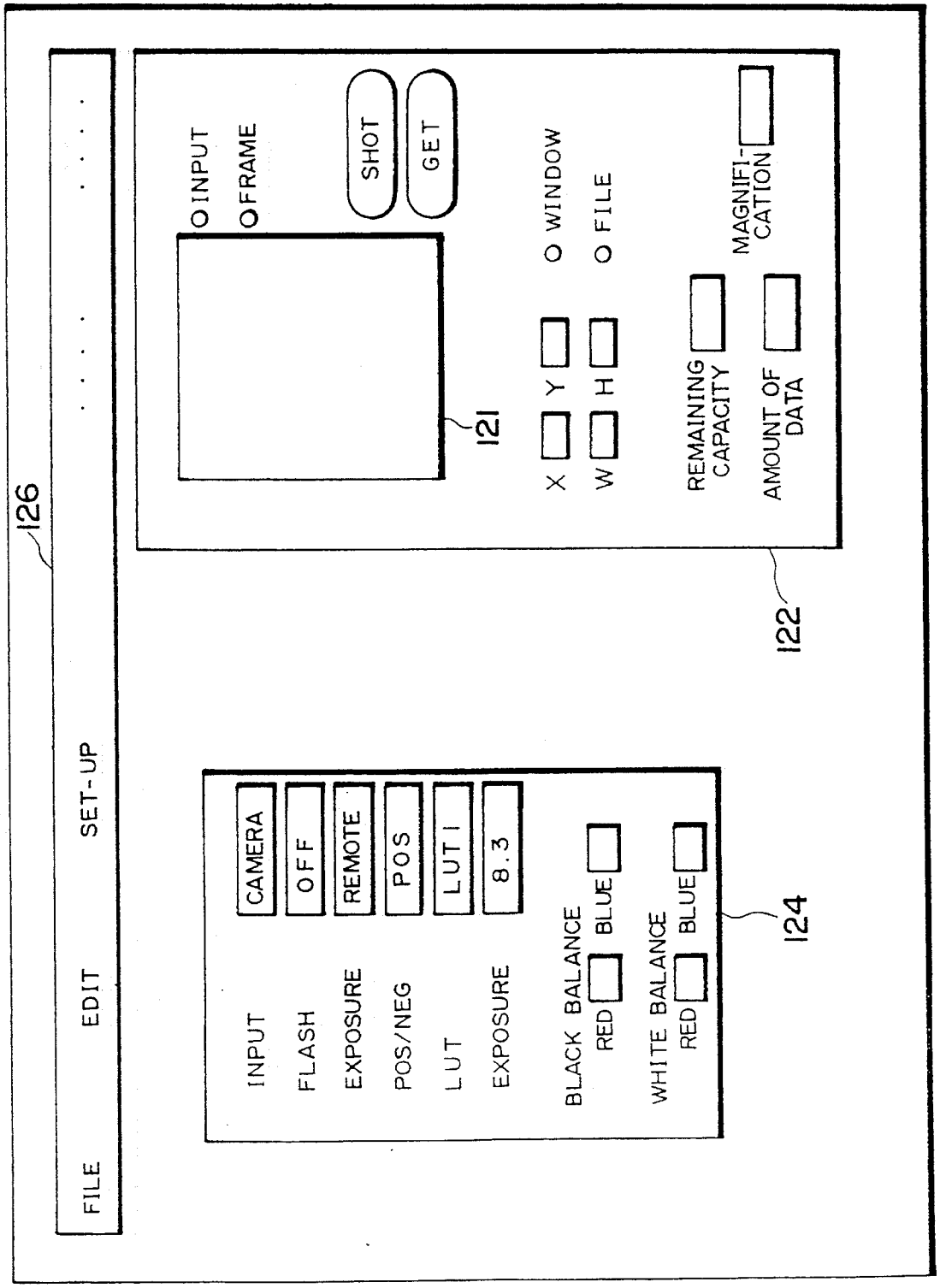
FIG. 14 is a diagram illustrating an example of a display on the display unit.

The operator observes the present f-stop value displayed and sets a new f-stop value as a target value if a change is necessary. This can be carried out by using the mouse 37 to change the length of a scroll bar 125A (the length of the portion indicated by the shading in FIG. 13) (step 96 in FIG. 5). The f-stop value represented by the length of the scroll bar 125A is displayed as the present value in the form of numerals. When the operator clicks "OK", the f-stop value represented by the length of the scroll bar 125A at this time is set. The f-stop value that has been set is displayed in the camera control-parameter display region 124, as illustrated in FIG. 14. Set-up data regarding the set f-stop value is transmitted to the electronic camera 10, where the data is stored in the camera control-parameter memory area 17B and the diaphragm of the camera is adjusted in such a manner that the set target value is attained (step 81, 82 in FIG. 4 and steps 114, 115 in FIG. 7). When the AE command is received in the electronic camera 10, automatic control for the diaphragm is carried out (step 116 in FIG. 7). The details of processing executed in the electronic camera 10 will be described later.

The parameter setting area 125 has a "Cancel" display as well (see FIG. 13). Clicking this allows the set f-stop value to be canceled.

Adjustment of black balance will be described next.

Figure 15:
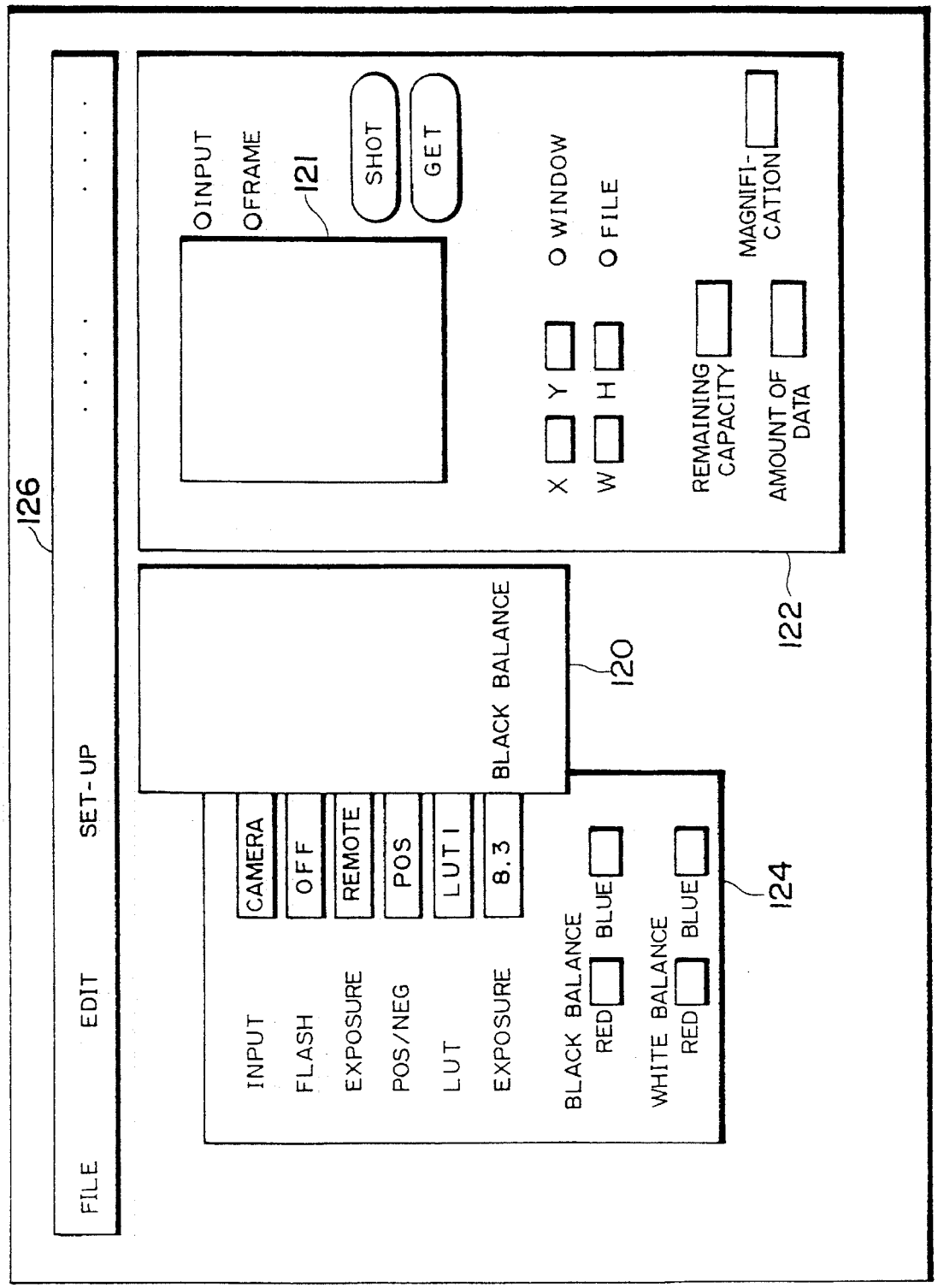
FIG. 15 is a diagram illustrating an example of a display on the display unit.
Figure 16:
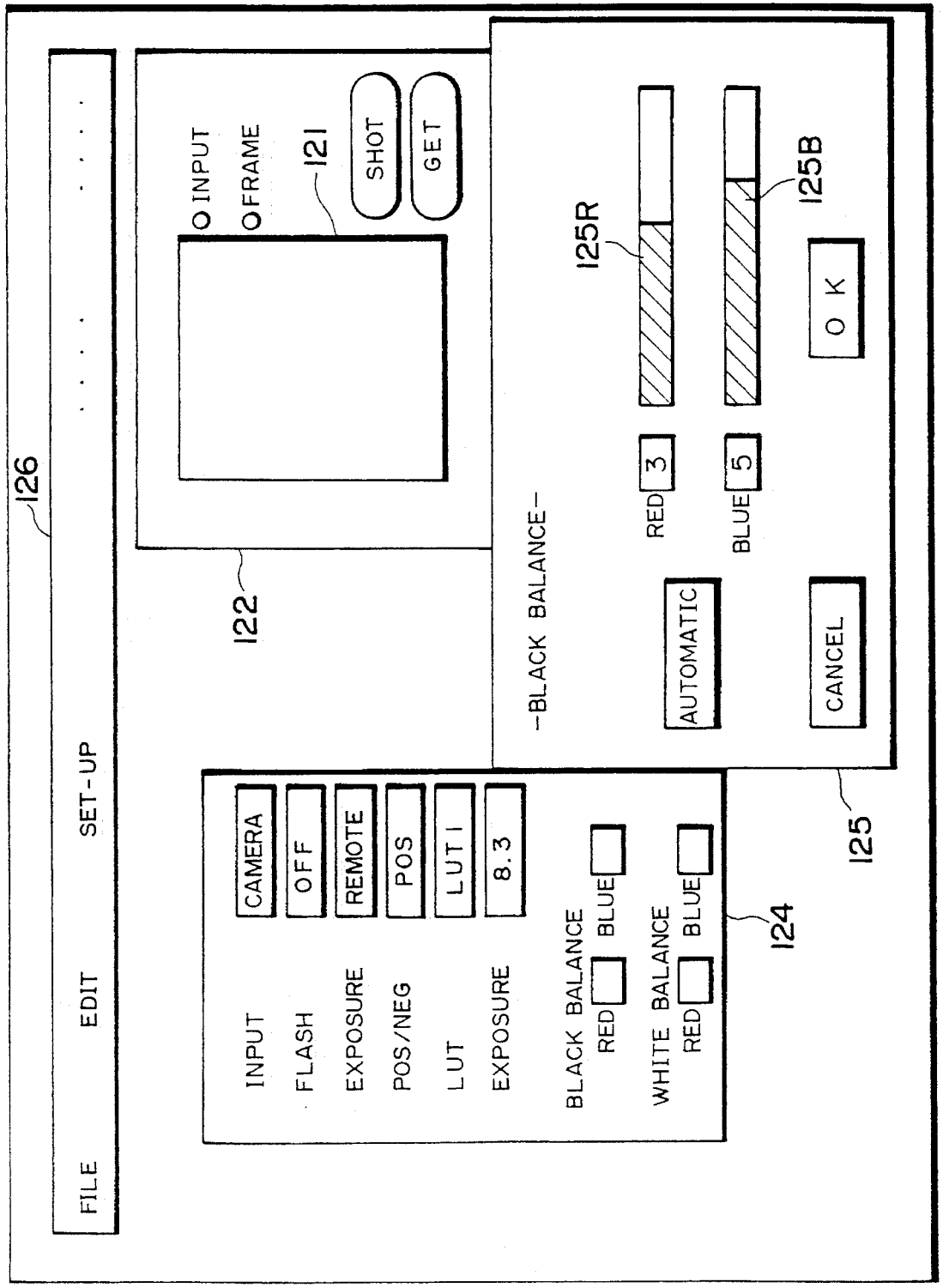
FIG. 16 is a diagram illustrating an example of a display on the display unit.

When "Black Balance" displayed in the set-up area 120 is clicked, as shown in FIG. 15, particulars suited to adjustment of black balance are displayed in the parameter setting area 125, as depicted in FIG. 16.

Though any of "AE", Remote" and "Manual" can be selected as "Select" items in relation to "Exposure", as set forth above, these are not included as "Select" items in relation to black balance. Accordingly, an "Automatic" display is included in the parameter setting area 125 so that automatic adjustment can be selected with regard to adjustment of black balance as well. When the operator clicks "Automatic", this fact is transmitted from the host computer 30 to the electronic camera 10 (steps 91, 92 in FIG. 5).

Adjustment of black balance is carried out with regard to red and blue. Remote control of black balance is set by clicking "Red" or "Blue" displayed in the parameter setting area 124. When remote control is set, a remote command is transmitted to the electronic camera 10 (step 93 in FIG. 5).

When the remote command is received in the electronic camera 10 (steps 111, 112 in FIG. 7), set values of black balance (the present controlled variable) that have been stored in the controlled-variable memory 17C are read out of this memory and sent to the host computer 30 (step 113 in FIG. 7).

The set values of black balance sent from the electronic camera 10 are received and displayed by host computer 30 (steps 94, 95 in FIG. 5). The set values are displayed in the camera controlled-variable display area 124, by way of example. The operator observes the present set values of black balance displayed and adjusts the black balance when a change is deemed necessary.

As in the manner of the setting of f-stop value, adjustment of black balance is carried out by manipulating the mouse 37 to adjust the lengths of scroll bars 125R, 125B (the lengths of the shaded portions) in such a manner that the desired values are attained. The set values regarding red and blue represented by the lengths of the scroll bars 125R, 125B, respectively, are displayed in the form of numerals.

When the "OK" display is clicked, these set values (target values) are transmitted to the electronic camera 10 (steps 96, 97 in FIG. 5).

The set values of black balance are received in the electronic camera 10 and black balance is adjusted in accordance with the target values that have been set (steps 81, 82 in FIG. 4 and steps 114, 115 in FIG. 7). The parameter setting area 125 includes a "Cancel" display as well.

When the automatic command has been applied to the electronic camera 10, automatic control of black balance is carried out (step 116 in FIG. 7).

Figure 17:
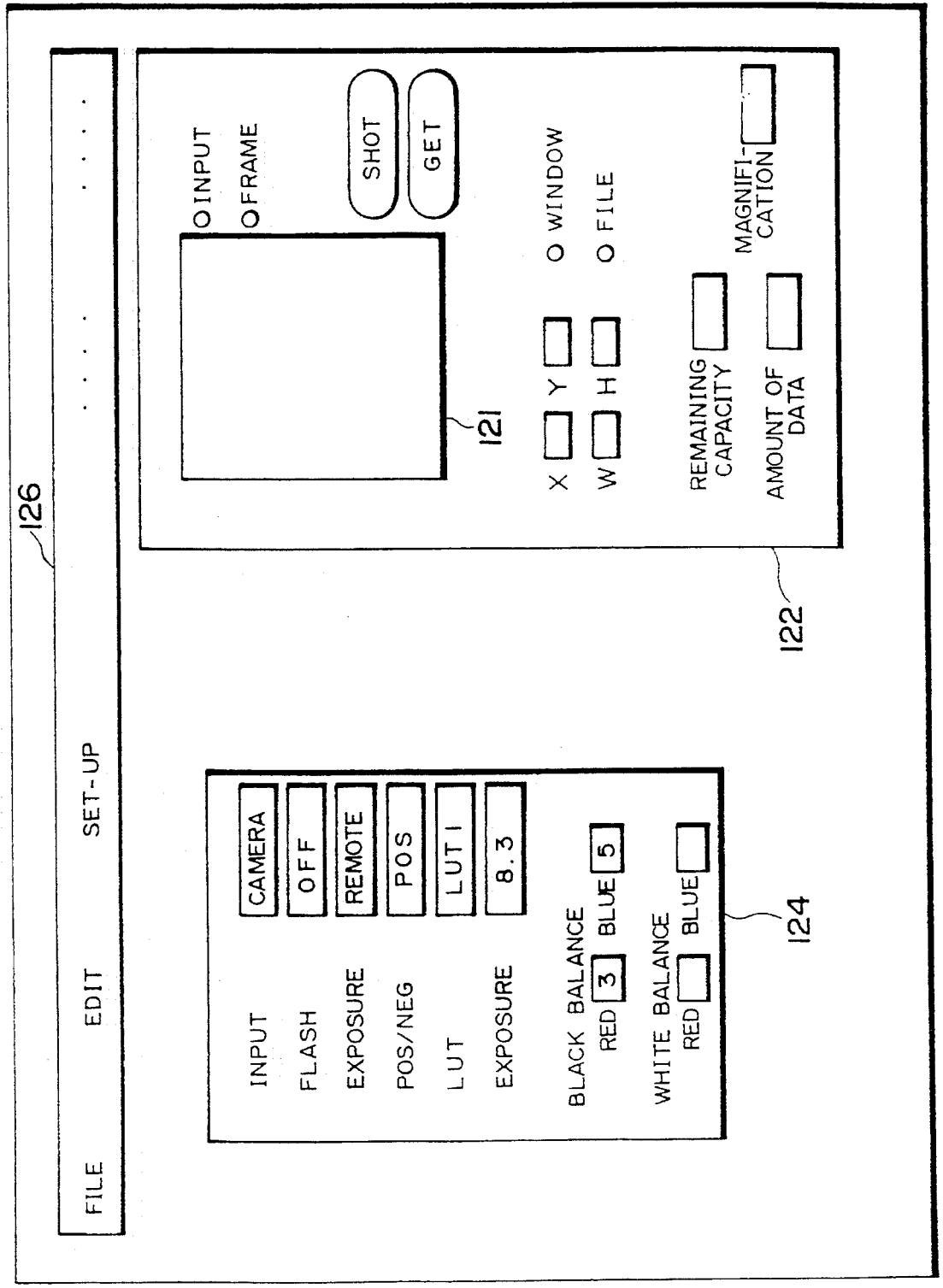
FIG. 17 is a diagram illustrating an example of a display on the display unit.

The set values of black balance are displayed in the camera control-parameter display area 124, as illustrated in FIG. 17. Adjustment of white balance is performed in the same manner as adjustment of black balance.

Figure 18:
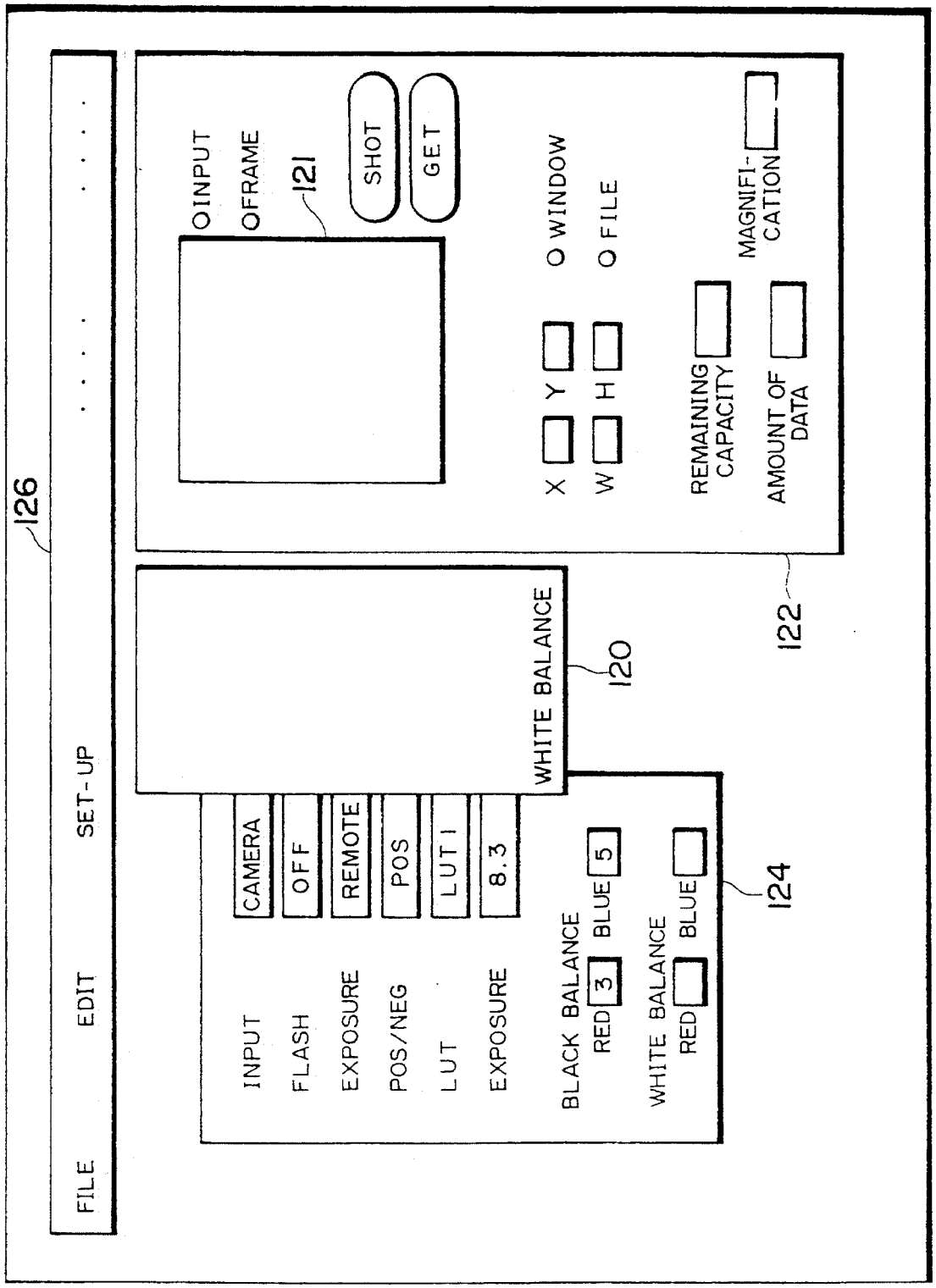
FIG. 18 is a diagram illustrating an example of a display on the display unit.
Figure 19:
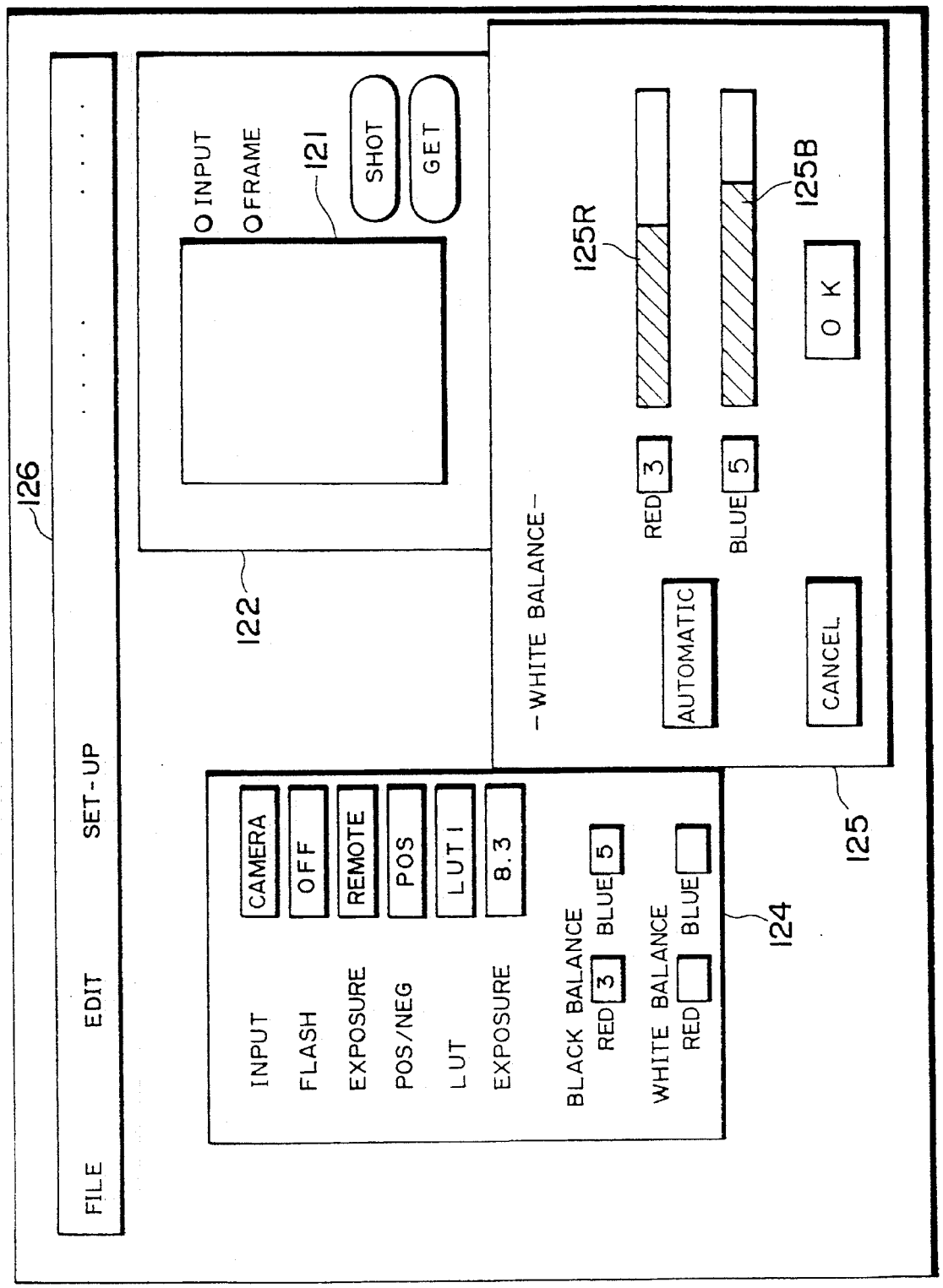
FIG. 19 is a diagram illustrating an example of a display on the display unit.

When "White Balance" displayed in the set-up area 120 is clicked, as shown in FIG. 18, particulars suited to adjustment of white balance are displayed in the parameter setting area 125, as depicted in FIG. 19.

An "Automatic" display is included in the parameter setting area 125 so that automatic adjustment can be selected with regard to adjustment of white balance as well, just as in the case of adjustment of black balance. When the operator clicks "Automatic", this fact is transmitted from the host computer 30 to the electronic camera 10 (steps 91, 92 in FIG. 5).

Adjustment of white balance is carried out with regard to red and blue. Remote control of white balance is set by clicking "Red" or "Blue" displayed in the parameter setting area 124. When remote control is set, a remote command is transmitted to the electronic camera 10 (step 93 in FIG. 5).

When the remote command is received in the electronic camera 10 (steps 111, 112 in FIG. 7), set values of white balance (the present controlled variable) that have been stored in the controlled-variable memory 17C are read out of this memory and sent to the host computer 30 (step 113 in FIG. 7).

The set values of white balance sent from the electronic camera 10 are displayed by host computer 30. The operator observes the set values of white balance displayed and adjusts the white balance when a change is deemed necessary (steps 94, 95 and 96 in FIG. 5.

Adjustment of white balance is carried out by manipulating the mouse 37 to adjust the lengths of scroll bars 125R, 125B to the desired lengths. The set values regarding red and blue represented by the lengths of the scroll bars 125R, 125B, respectively, are displayed in the form of numerals.

When the "OK" display is clicked, these set values (target values) are transmitted to the electronic camera 10 (step 97 in FIG. 5). When the set values of white balance are received in the electronic camera 10, white balance is adjusted in accordance with the set values (steps 81, 82 in FIG. 4 and steps 114, 115 in FIG. 7).

Figure 20:
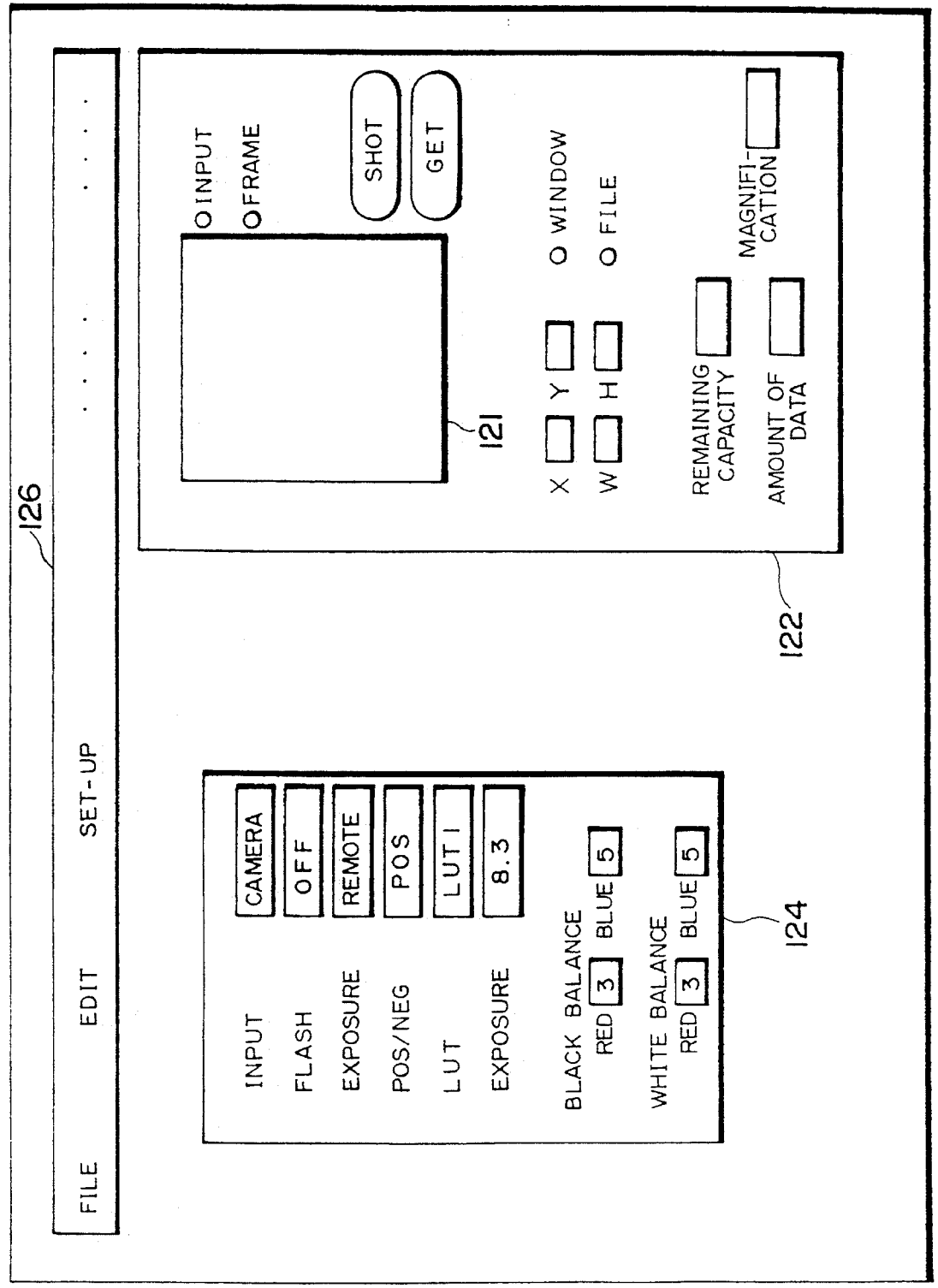
FIG. 20 is a diagram illustrating an example of a display on the display unit.

Thus, photographic control of the electronic camera 10 is carried out in response to commands from the host computer 30. All of the camera control data set in the set-up mode is displayed in the camera control-parameter display area 124, as shown in FIG. 20. This data is stored in the camera control-parameter memory 32B of the main memory 32 in the host computer 30 and in the reception buffer 17D of the main memory 17 in the electronic camera 10, after which the data is stored in the camera control-parameter memory 17B of the main memory 17. In the electronic camera 10, adjustment is performed based upon the camera control parameters when the parameters stored in the camera control-parameter memory 17B and the parameters stored in the controlled-variable memory 17C coincide. This adjustment will be described later in greater detail.

Lens position and zoom magnification, etc., for the purpose of focusing may also be stored in the camera control-parameter memory 32B, and these may be read out of the controlled-variable memory 17C, transmitted to the host computer 30 and displayed thereby when remote operation is performed.

The capture-command input area 122 will be described next.

Figure 21:
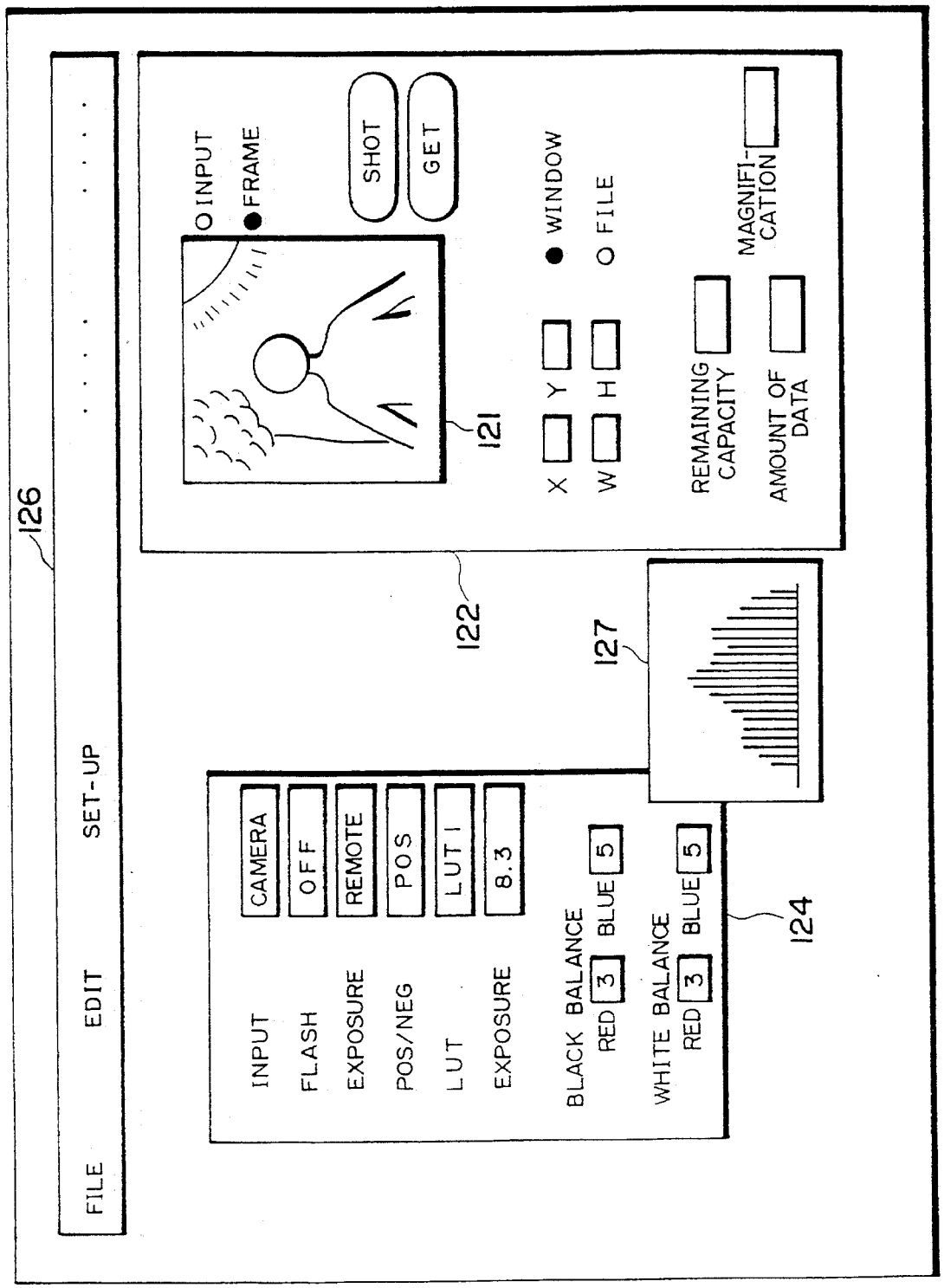
FIG. 21 is a diagram illustrating an example of a display on the display unit.

As illustrated in FIG. 21, the capture-command input area 122 displays "Input", "Frame", "Shot", "Get", "Window", "File", "X", "Y", "W", "H", "Remaining Capacity", "Amount of Data" and "Magnification". The preview-image display area 121 displays the image of the subject being photographed by the electronic camera 10.

"Input" and "Frame" are for selecting from where a video signal representing the image displayed on the monitor display unit 5 will be obtained. In the "Input" mode, the video signal obtained from the CCD 13 is applied directly to the monitor display unit 5 via the signal processing circuit 14 without being passed through the image memory 16. The CCD 13 is capable of being changed over selectively between ordinary NTSC drive (640×480 pixels) and high-definition (often referred to as "high-vision") drive (1280×960 pixels). Since monitor display unit 5 is operated at the NTSC rate, the CCD 13 is subjected to NTSC drive in the "Input" mode. In the frame mode, on the other hand, the image data that has been stored in the image memory 16 is applied to the monitor display unit 5 through the D/A converting circuit 29 and the image represented by this image data is displayed. In order to change over between the video signal (the "Input" mode) outputted by the signal processing circuit 14 and the video signal ("Frame" mode) outputted by the D/A converting circuit 29, a changeover circuit 6 controlled by the camera control unit 18 is provided.

In FIG. 21, a black dot is displayed alongside "Frame" and indicates that the "Frame" mode has been set. The processing of steps 83 ~90 shown in FIG. 4 also indicates operation in the "Frame" mode.

"Shot" is for applying a command which causes the electronic camera 10 to photograph the subject and transmit the image data obtained by such photography to the host computer 30 upon thinning out the data. The image data obtained by photography using the electronic camera 10 in response to clicking of "Shot" is stored temporarily in the image memory 16, the image data is reduced to ⅛ in each of the horizontal and vertical directions, as will be described later, and the resulting data is transmitted to the host computer 30, where the data is displayed in the preview-image display area 121 as a preview image. Photography of the subject is carried out by high-definition drive of the CCD 13. When a "Shot" command is applied, the "Frame" mode is established automatically and the image represented by the image data that has been stored in the image memory 16 is displayed on the monitor display unit 5.

By clicking "Shot", the histogram window 127, which represents a pixel-level histogram of the preview image, is displayed on the screen of the display unit 40. Since a color-level distribution of the preview image is displayed in the histogram window 127, this can be utilized in the setting of optimum photographic conditions.

"Get", which commands that the image data obtained by photography in the electronic camera 10 be finally accepted by the host computer 30, is meaningful in the "Frame" mode. In general, as will be described below, clicking "Shot" causes the preview image to be displayed in the preview-image display area 121. After the area and magnification (resolution) are designated, "Get" is clicked.

"Window" and "File" are for designating the destination of the image data to be accepted in accordance with the "Get" command. When "Window" is clicked, the image data transmitted from the electronic camera 10 is stored in transfer buffer 32A of the main memory 32, and the image represented by this image data is displayed in the main-image display area 123 of the display unit 40. When "File" is clicked, the image data transmitted from the electronic camera 10 is stored in the transfer buffer 32A of the main memory 32, after which the image data is stored on the optical disk by the optical disk unit 38 while being subjected to processing as necessary.

Figure 22:
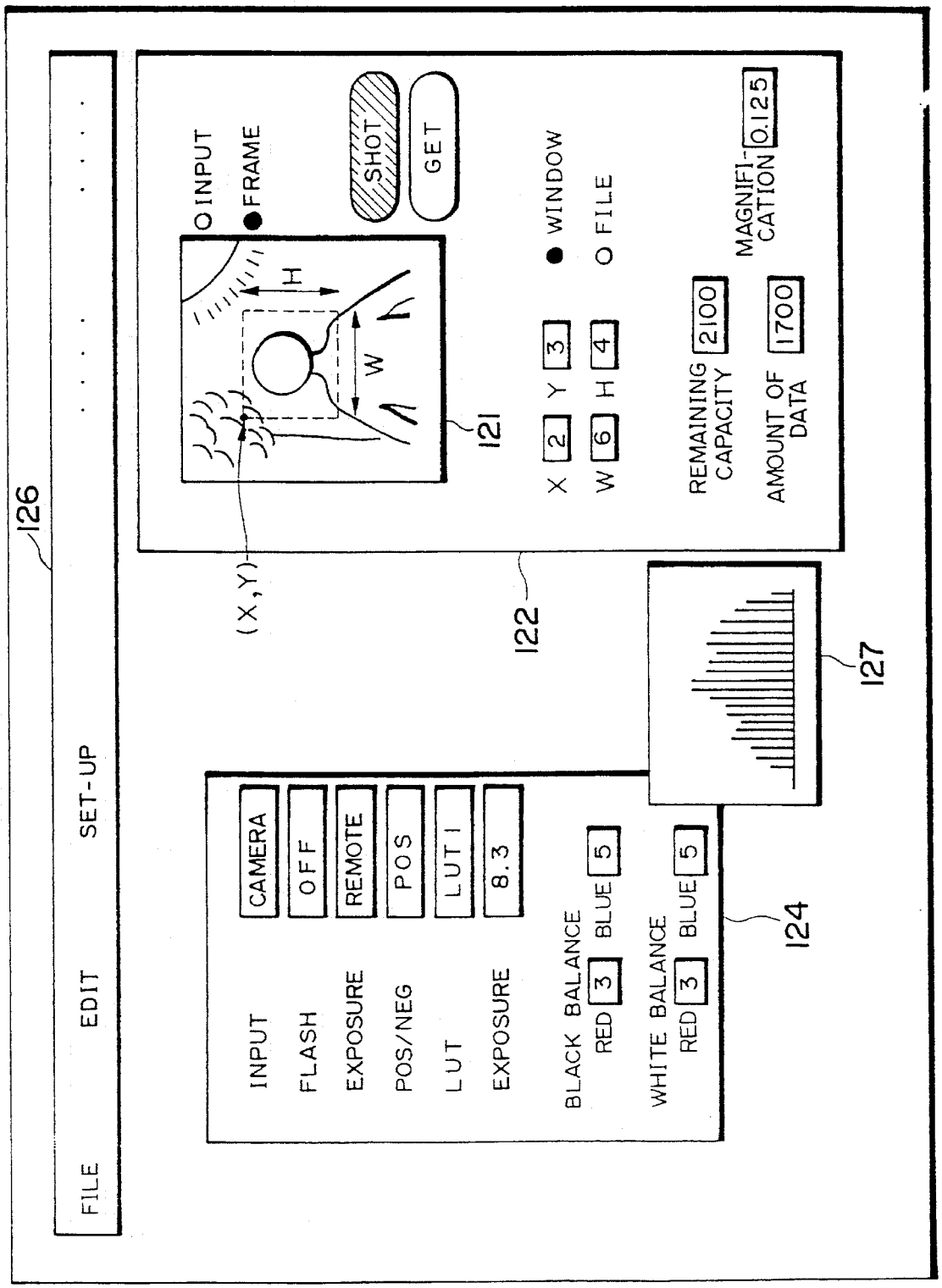
FIG. 22 is a diagram illustrating an example of a display on the display unit.

"X", "Y", "W" and "H" are for designating, on the preview image, the image area to be accepted in accordance with the "Get" command. As shown in FIG. 22, "X" and "Y" represent X and Y coordinates of one corner of a designation zone (indicated by the dashed line in FIG. 22), "W" represents the width of the designation zone, and "H" represents the height of the designation zone. The desired area can be designated by inputting the values of "X", "Y", "W" and "H" using the mouse 37.

Magnification is for selecting the resolution of the image to be accepted in accordance with the "Get" command. In this embodiment, any of magnifications 1×, 0.5×, 0.25×, 0.125× can be selected by the mouse 37. If the enlargement ratio in the zoom-lens mechanism 11 is capable of being set or manually adjusted in the host computer 30, it is possible for the magnification of photography to be made a value which exceeds 1×. In this embodiment, a value which exceeds 1× is set as the magnification only when the operator enlarges the zoom-lens mechanism 11 of the electronic camera 10 by a manual operation.

"Remaining Capacity" indicates the remaining body of the transfer buffer 32A in the main memory 32 of host computer 30.

"Amount of Data" indicates the amount of image data transmitted from the electronic camera 10 in response to the "Get" command.

FIGS. 3 and 4 will be referred to again to systematically describe the processing executed, in response to inputs of various commands from the capture-command input area 122 of the host computer 30, for imaging the subject at the electronic camera 10, transmitting the image data obtained by imaging to the host computer 30 and displaying the image data on the display unit 40.

When the above-described set-up processing (step 62 in FIG. 3) ends, the host computer 30 waits for clicking of "Shot" (step 63 in FIG. 3) or waits for designation of the designation zone, magnification and destination for acceptance of the image data resulting from photography (step 68 in FIG. 3).

When "Shot" is clicked (step 63 in FIG. 3), a shot command is created by the CPU 31 (step 64 in FIG. 3). The shot command created is transmitted to the electronic camera 10.

Next, a preview command is created (step 65 of FIG. 3). The preview command is a command for transmitting the image data, which is obtained by photography, upon reducing the data (to ⅛ uniformly according to this embodiment). This command is sent to the electronic camera 10.

When the shot command is received in the electronic camera 10 (step 83 in FIG. 4), photography of the subject SU and the necessary image-data processing are performed under the conditions of the camera control parameters already set.

The image data obtained by imaging and processing is stored in the image memory 16 (step 84 in FIG. 4).

Next, when the preview command is received in the electronic camera 10 (step 85 in FIG. 4), the frame mode is established if the input mode is in effect. When the frame mode is thus established, the image data that has been stored in the image memory 16 is read out and applied to the thinning-out circuit 19. In the thinning-out circuit 19, the image data is thinned out to uniformly to ⅛ (i.e., one pixel is extracted from eight pixels) so as to obtained image data composed of 160 pixels in the horizontal direction and 120 pixels in the vertical direction. The image data that has been thinned out is applied to, and temporarily stored in, the transfer buffer 17A from the thinning-out circuit 19 (step 86 in FIG. 4). The image data temporarily stored in the transfer buffer 17A is transmitted to the host computer 30.

When the image data reduced to ⅛ in each of the horizontal and vertical directions and transmitted from the electronic camera 10 is received in the host computer 30, this preview image data is temporarily stored in the transfer buffer 32A (step 66 in FIG. 3). The image data that has been stored in the transfer buffer 32A is read out of the transfer buffer 32A and applied to the display memory 34, and the preview image represented by this image data is displayed in the preview-image display area 121 (step 67 in FIG. 3). An example of the preview image displayed in the preview-image display area 121 is illustrated in FIG. 21.

The operator observes the preview image and is capable of verifying whether a picture of the desired angle, size and quality has been obtained. If necessary, the camera control parameters may be reset (step 62 in FIG. 3).

In order to observe, at the host computer 30, whether the desired image data has been obtained, it is required that the image data be transmitted from the electronic camera 10 to the host computer 30. One frame of image data is composed of 1280×960 pixels (1228 kilobytes in case of one byte per pixel, and three times this number of kilobytes in case of color photography), as mentioned earlier, and therefore the amount of data is very large. Consequently, transmission of this data requires a long period of time. With regard to the preview image data, the data is reduced to ⅛ in the horizontal and vertical directions and then sent from the electronic camera 10 to the host computer 30, as set forth above. The transmission time for this data, therefore, can be shortened.

When the operator verifies that an excellent image has been obtained by observing the preview image, final acceptance of the image data resulting from imaging is required. Though it is permissible to accept the image data of the entirety of one frame (1280×960 pixels), in general there are many cases in which only a portion of the image data is needed. Accordingly, the operator designates, on the preview image, the area of the image to be accepted, the magnification and the destination for acceptance, as shown in FIG. 22 (YES at step 68 in FIG. 3). Next, the operator clicks "Get" (YES at step 69 in FIG. 3). When this is done, the get command, which includes the designated area and the magnification, is created, and this is sent to the electronic camera 10 (step 70 in FIG. 3).

When an enlarged image is desired, the operator is capable of manually operating the zoom-lens mechanism 11 of the electronic camera 10 to set the mechanism to the desired magnification, as mentioned above. In this case, the operator clicks "Shot" again to repeat the photographing and previewing of the subject.

When the get command is received in the electronic camera 10 (step 88 in FIG. 4), the image data of the designated area is read out of the image memory 16.

When the magnification is less than 1×, the image data read out of the image memory 16 is applied to the thinning-out circuit 19, where thinning-out in conformity with the set magnification is performed. After the image data is temporarily stored in the transfer buffer 17A (step 89 in FIG. 4), the image data is sent to the host computer 30 (step 90 in FIG. 4).

Thus, since only the image data regarding an area actually necessary is transmitted from the electronic camera 10, the transmission time of the image data can be shortened.

Figure 23:
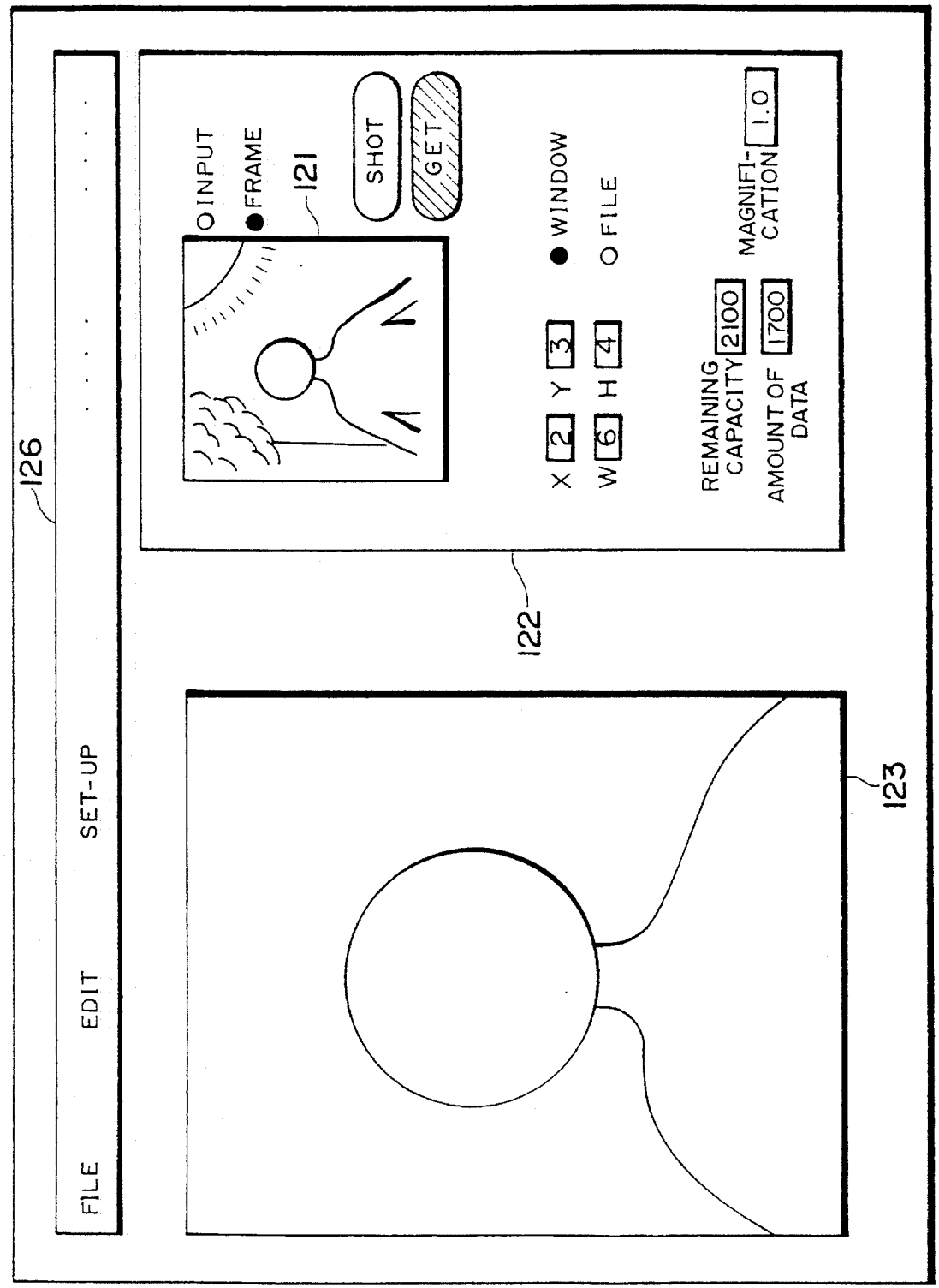
FIG. 23 is a diagram illustrating an example of a display on the display unit.
Figure 24:
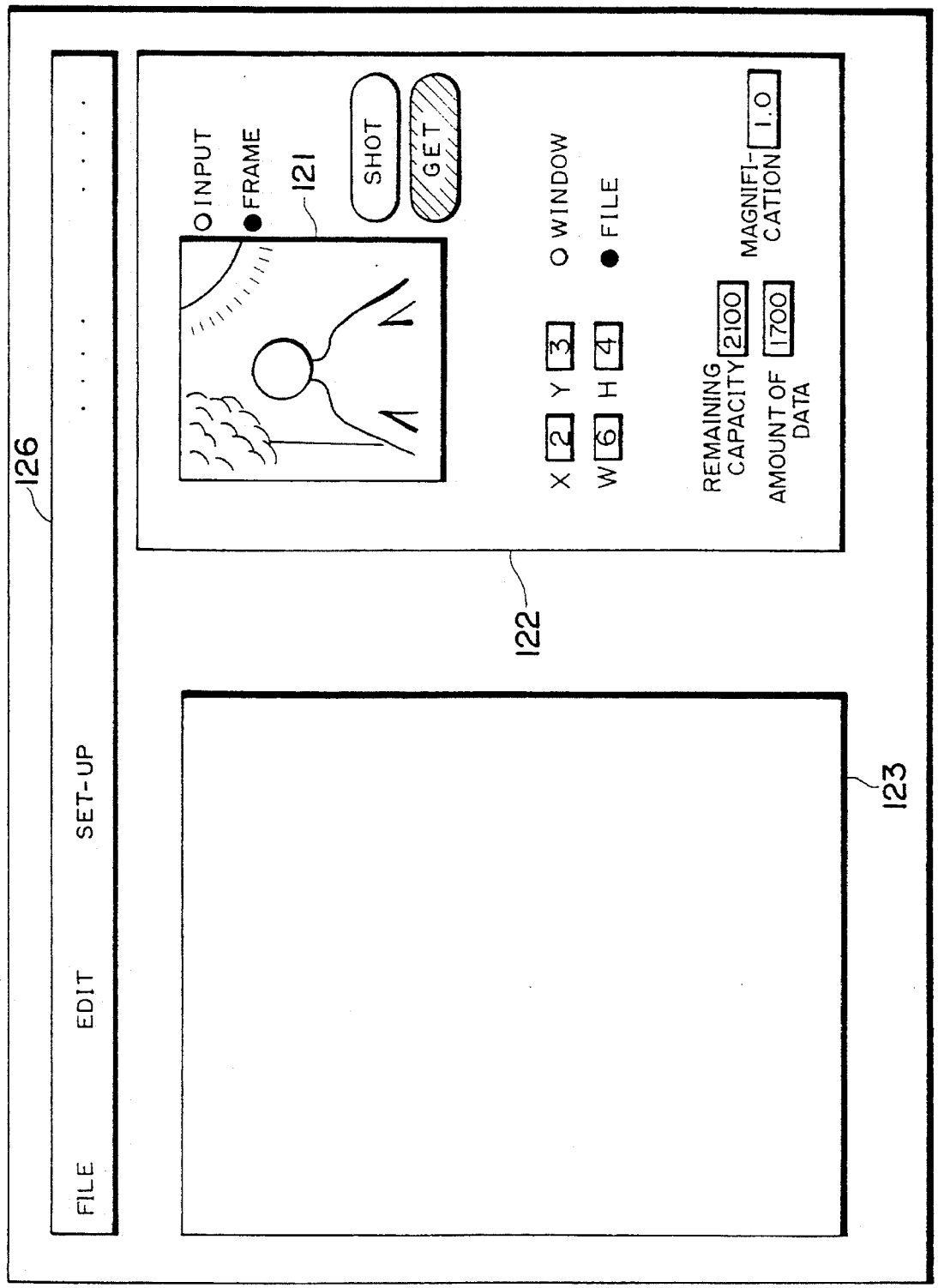
FIG. 24 is a diagram illustrating an example of a display on the display unit.

The image data transmitted from the electronic camera 10 is received in the host computer 30 (step 71 in FIG. 3). When the image data is received, the image data is transferred to the destination for acceptance designated previously. Specifically, if the destination is "Window" (the main memory), the received image data is stored in the transfer buffer 32A of main memory 32 and the image represented by this image data is displayed in the main-image display area 123 of the display unit 40, as illustrated in FIG. 23 (step 73 in FIG. 3). If the destination is "File", the received image data is temporarily stored in the main memory 32, after which it is subjected to processing as necessary and transferred to the optical disk unit 38, where the image data is stored (step 75 in FIG. 3). At this time the image is not displayed in the main-image display area 123 (see FIG. 24), but an arrangement may be adopted in which the image is displayed.

The operator may click "File" after designating "Window" as the destination for acceptance and observing the image of the subject displayed in the main-image display area 123. In response, the image data that has been stored in the main memory 32 is recorded on the optical disk (YES at step 74, followed by step 75, in FIG. 3). Of course, operation from the "Shot" command onward may be done over without clicking "File".

Since the remaining capacity of main memory 32 and the amount of image data that has been sent are being displayed in the capture-command input area 122, the operator is capable of inputting the various commands mentioned above while observing these quantities. Preferably, an arrangement is adopted in which input of the "Get" command is forbidden when the remaining capacity of the main memory 32 is less than the amount of image data that will be sent from the electronic camera 10.

Set-up processing (which corresponds to FIG. 5) of camera control parameters in the host computer 30 and adjustment processing (which corresponds to FIG. 7), conforming to set-up data sent from the host computer 30, in the electronic camera 10 will now be described in detail with reference to the flowcharts of FIGS. 25 and 26.

Figure 25:
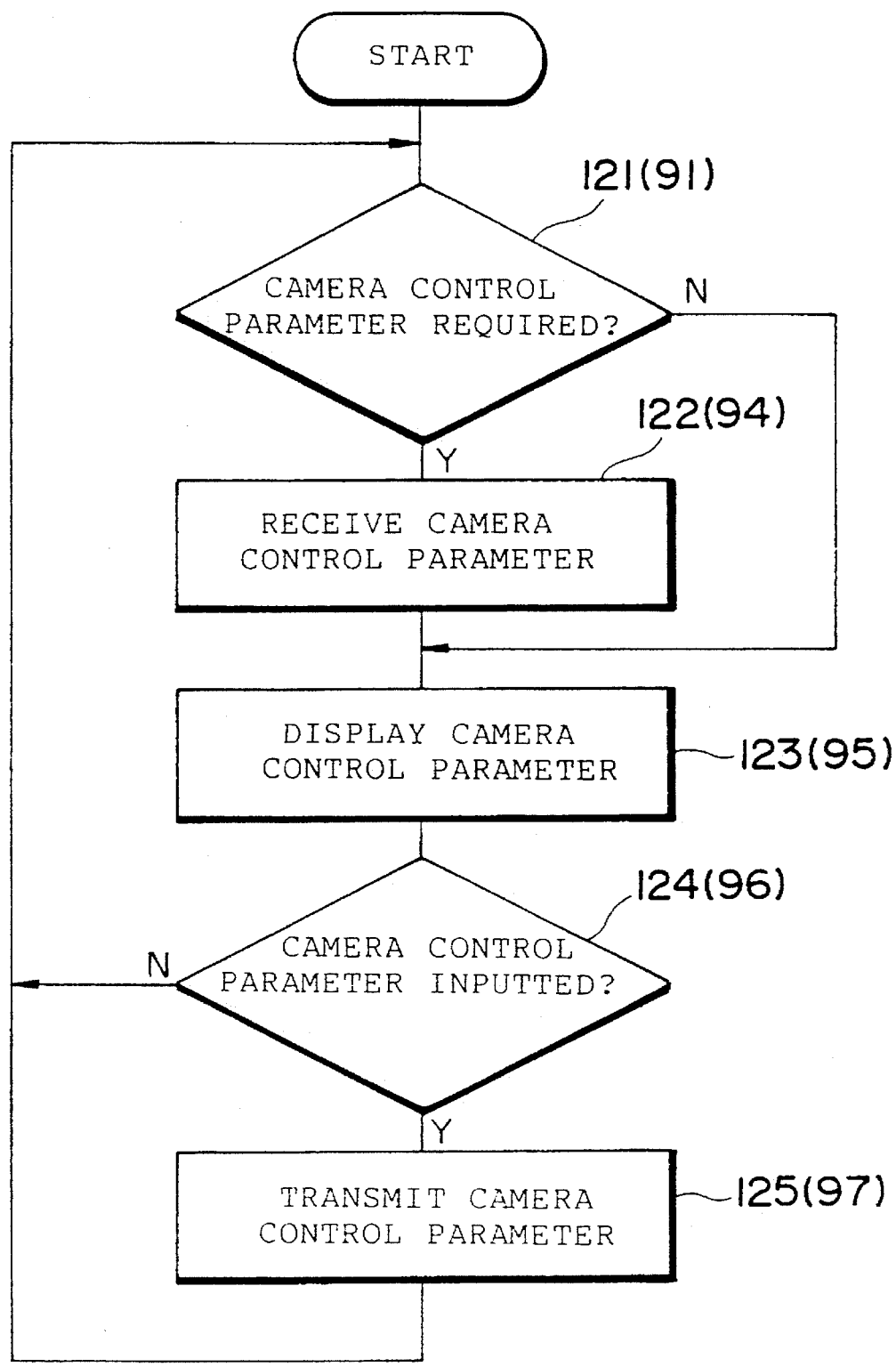
FIG. 25 is a flowchart showing part of a procedure of set-up processing.

In FIG. 25, blocks whose processing is identical with the processing shown in FIG. 5 have reference numerals corresponding to the blocks in FIG. 5 enclosed in parentheses. In FIG. 26 also, blocks whose processing is identical with the processing shown in FIG. 7 have reference numerals corresponding to the blocks in FIG. 7 enclosed in parentheses. However, the processing shown in FIGS. 25 and 26 may be positioned in another form without necessarily being correlated to the processing of FIGS. 5 and 7.

Figure 26:
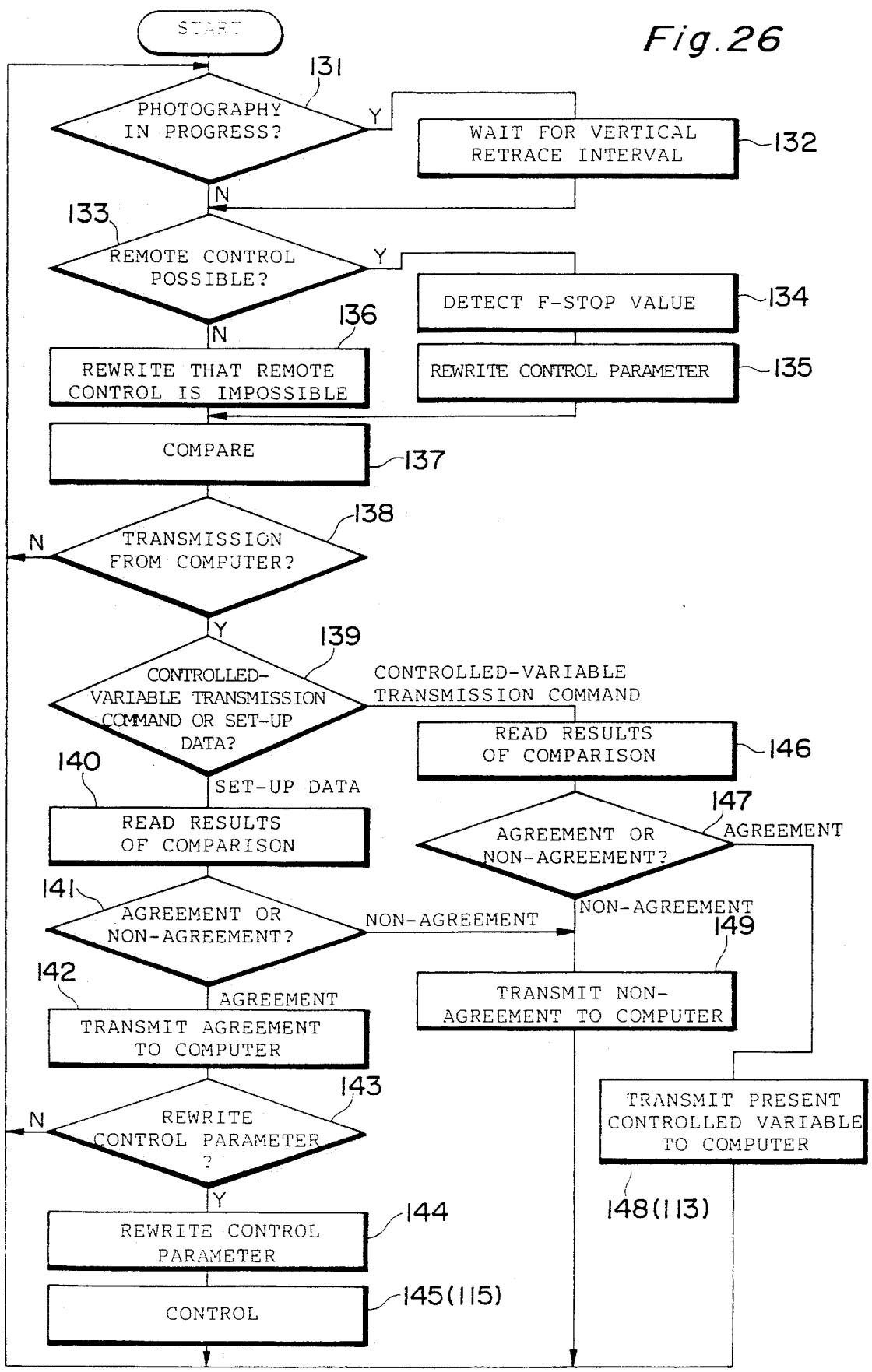
FIG. 26 is a flowchart showing processing for rewriting camera control parameters.

After the power supply of the electronic camera 10 has been turned on, it is determined whether photography is in progress (step 131 in FIG. 26). If it is determined that photography is not in progress, then it is determined whether the zoom-lens mechanism 11 and the diaphragm 12 installed in the electronic camera 10 are capable of being remotely controlled (step 133).

If the zoom-lens mechanism 11 and diaphragm 12 are remotely controllable, the presently prevailing f-stop value is detected (step 134). The detected f-stop value is applied to the main memory 17 and stored in the controlled-variable memory 17C as a new f-stop value (step 135). When the zoom-lens mechanism 11 and diaphragm 12 installed in the electronic camera 10 are not capable of being remotely controlled, the fact that remote control is impossible is stored in the controlled-variable memory 17C (step 136).

The values of white balance and black balance also are detected and stored in the controlled-variable memory 17C. It is not always necessary to detect these values.

In order to prevent the image from being disturbed in processing for detecting the controlled variables such as the f-stop value in a case where photography of a subject is being carried out (YES at step 131), the above-mentioned processing is not executed until the vertical retrace interval is attained (step 132). The detection of the f-stop value of the diaphragm 12 is performed periodically unless photography of a subject is in progress. If photography is in progress, detection of the f-stop value is performed in every vertical retrace interval. Thus, the f-stop value of the diaphragm 12 is stored in the controlled-variable memory 17C as new data at all times. If necessary, the other controlled variables such as the values of white balance and black balance also are stored in the controlled-variable memory 17C as new data at all times.

Transmissions from the host computer 30 to the electronic camera 10 are of two types, namely transmission of set-up data and transmission of controlled-variable transmission commands.

Transmission of set-up data is processing for transmitting camera control parameters that have been set up, as described earlier. Transmission of a controlled-variable transmission command is processing for transmitting a command which causes the presently prevailing controlled variable in the electronic camera 10 to be transmitted to the host computer 30.

If it is necessary to know (step 121 in FIG. 25) a present controlled variable that has been set in the electronic camera when set-up processing for camera control data is carried out, a notification mode is designated using the keyboard 36. When this is done, a controlled-variable transmission command is created in the CPU 31. The created controlled-variable transmission command is transmitted to the electronic camera 10. The same is true also in a case where the above-described "Remote" mode has been set.

Each section of the electronic camera 10 is subjected to feedback control in conformity with the camera control parameter stored in the camera control-parameter memory 17B, and the detected controlled variable is stored in the controlled-variable memory 17C. This means that the present controlled variable that has been stored in the controlled-variable memory 17C and the camera control parameter that has been stored in the camera cOntrol-parameter memory 17B should originally agree. However, the two will not agree if the imaging optical system which includes the diaphragm 12 is shifted after storage of the parameter in the camera control-parameter memory 17B and control of the diaphragm 12, or when an imaging optical system having different control parameters has been installed in the electronic camera 10. At such time, accurate control cannot be carried out even if the electronic camera 10 is controlled based upon the control parameters sent from the host computer 30. Therefore, when the controlled-variable transmission command is sent from the host computer 30, the present controlled variable (f-stop value, black balance, white balance, etc.) that has been stored in the controlled-variable memory 17C and the camera control parameter that has been set in the camera control-parameter memory 17B are compared periodically (step 137).

If data or a control command is not sent from the host computer 30, the program returns to step 131 (step 138).

When there is a transmission from the host computer 30, the content thereof is analyzed in the electronic camera 10 (steps 138, 139). When a controlled-variable transmission command has been received, the results of the comparison performed immediately prior to receipt of this command are read (step 146).

When it is determined that the results of comparison indicate agreement, the controlled variable that has been stored in the controlled-variable memory 17C is transmitted to the host computer 30 (steps 147, 148). Thus, controlled variables of the electronic camera 10 are transmitted to the host computer 30 only in response to the transmission control command from the host computer 30.

In the host computer 30, the camera control parameters sent from the electronic camera 10 are received (step 122 in FIG. 25) and the contents of the camera control parameters are displayed on the display unit 40 (step 123). Set-up processing is executed with regard to any of the displayed camera control parameters that require to be set or changed.

If the results of processing indicate non-agreement, this fact is transmitted to the host computer 30 (step 149 in FIG. 26). In response, the electronic camera 10 is inspected by the operator.

The results of comparing the controlled variable stored in the controlled-variable memory 17C and the camera control parameter stored in the camera control-parameter memory 17B are read also when set-up data such as the f-stop value, black-balance value and white-balance value, etc., set as described above have been transmitted to the electronic camera 10 (steps 139, 140). With regard to the values of black and white balance, however, comparison and reading of the results thereof are not always required. The set-up data sent from the host computer 30 is temporarily stored in the reception buffer 17D.

If, as a result of the comparison, it is found that the camera control parameter and the controlled variable that have been stored in the memories 17B and 17C, respectively, do not agree (step 141), it can be determined that control based upon the camera control parameter that has been sent from the host computer 30 is not capable of being achieved properly. In case of non-agreement, therefore, this fact is transmitted to the host computer 30 (step 149). As a result, it can be determined on the side of the host computer 30 that the imaging optical system has been exchanged for other, by way of example.

If, as a result of the comparison, it is found that the camera control parameter of the f-stop value and the controlled variable that have been stored in the memories 17B and 17C, respectively, agree, this fact is transmitted to the host computer 30 (step 142). The set-up data stored temporarily in the reception buffer 17D is stored in the camera control-parameter memory 17B (steps 143, 144).

When the camera control parameter is stored in the camera control-parameter memory 17B, control is performed in such a manner that this parameter will become the set target value (step 145).

Thus, since control is possible only when accurate control can be achieved, precise adjustment of controlled variables can be performed at all times.

Figure 27:
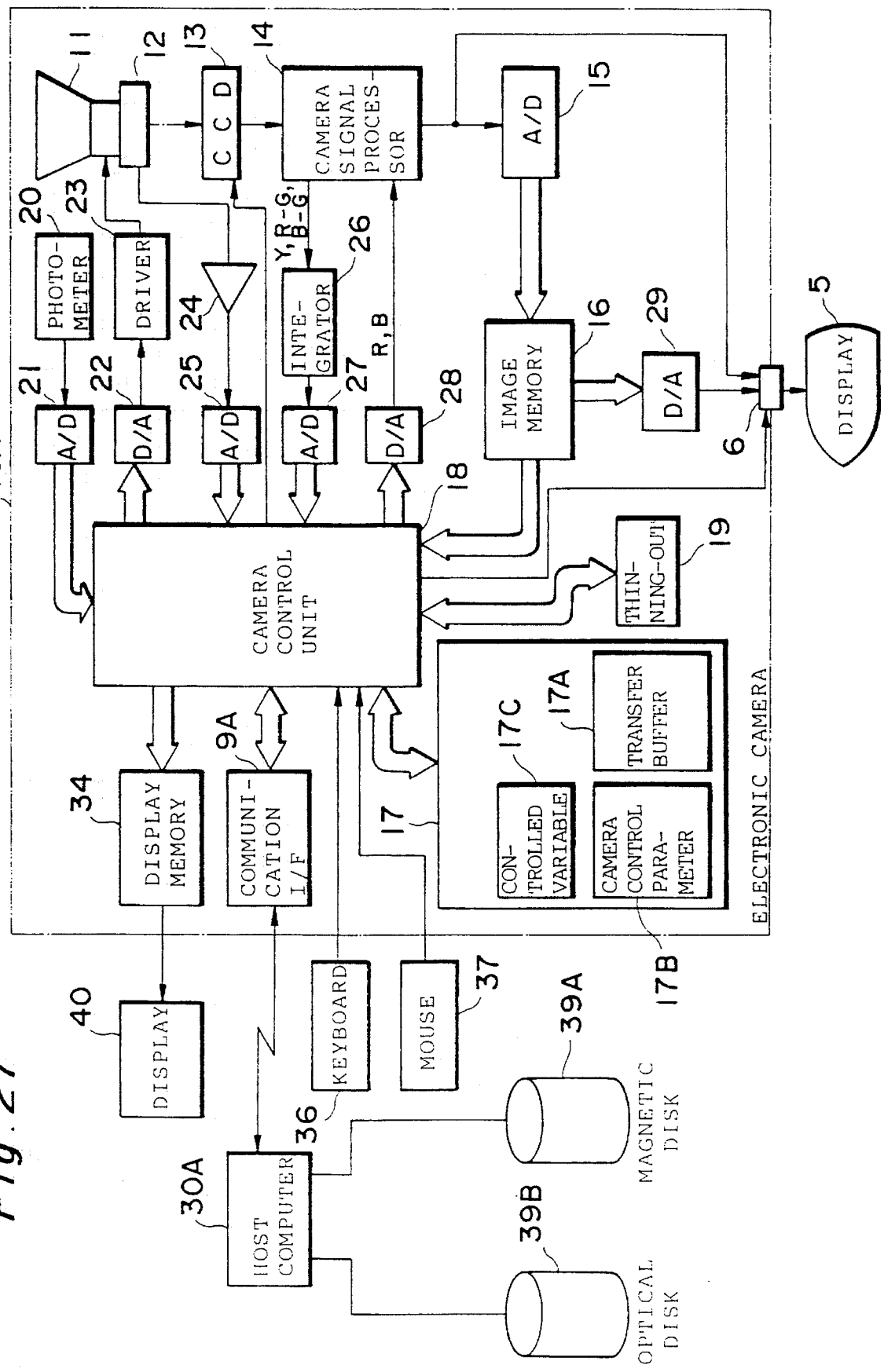
FIG. 27 is a block diagram showing the electrical construction of an imaging system according to another embodiment of the present invention.

FIG. 27 is a block diagram showing the electrical construction of an imaging system according to another embodiment of the invention. Elements identical with those shown in FIG. 2 are designated by like reference characters and need not be described again.

The imaging system shown in FIG. 27 differs from that of FIG. 2 in that the display unit 40, the keyboard 36 and the mouse are connected to the electronic camera, which is designated at 10A. The electronic camera 10A is capable of communicating with a host computer 30A, which is capable of recording image data on a magnetic disk 39A and an optical disk 39B, via a communication interface 9A.

In the electronic camera 10A, the camera control parameters that have been set using the display unit 40 and the keyboard 36 or mouse 37 are stored directly in the camera control-parameter memory 17B. The presently prevailing set controlled variables are read out of the controlled-variable memory 17C and displayed on the display unit 40. If necessary, controlled variables may be changed.

The image data obtained by imaging is not sent to the host computer 30A but is instead applied to the display unit 40, where the preview image and main image are displayed. Only image data having the desired magnification and lying in the required area is transmitted to the host computer 30A and recorded on the magnetic disk 39A or optical disk 39B or stored in the transfer buffer 17A of the main memory 17 in the electronic camera 10A.

Figure 28:
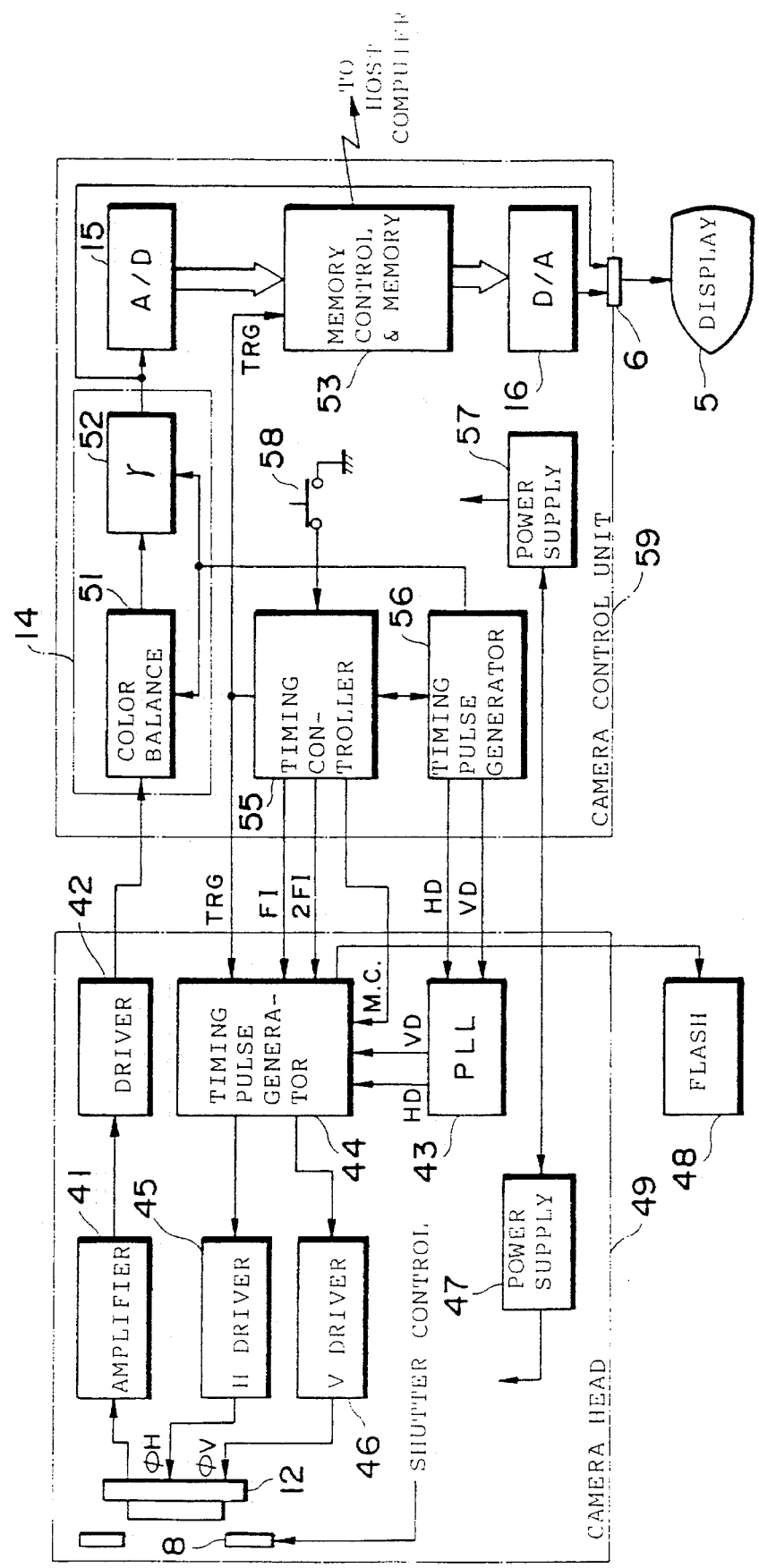
FIG. 28 is a block diagram showing the construction of an electronic camera.
Figure 29:
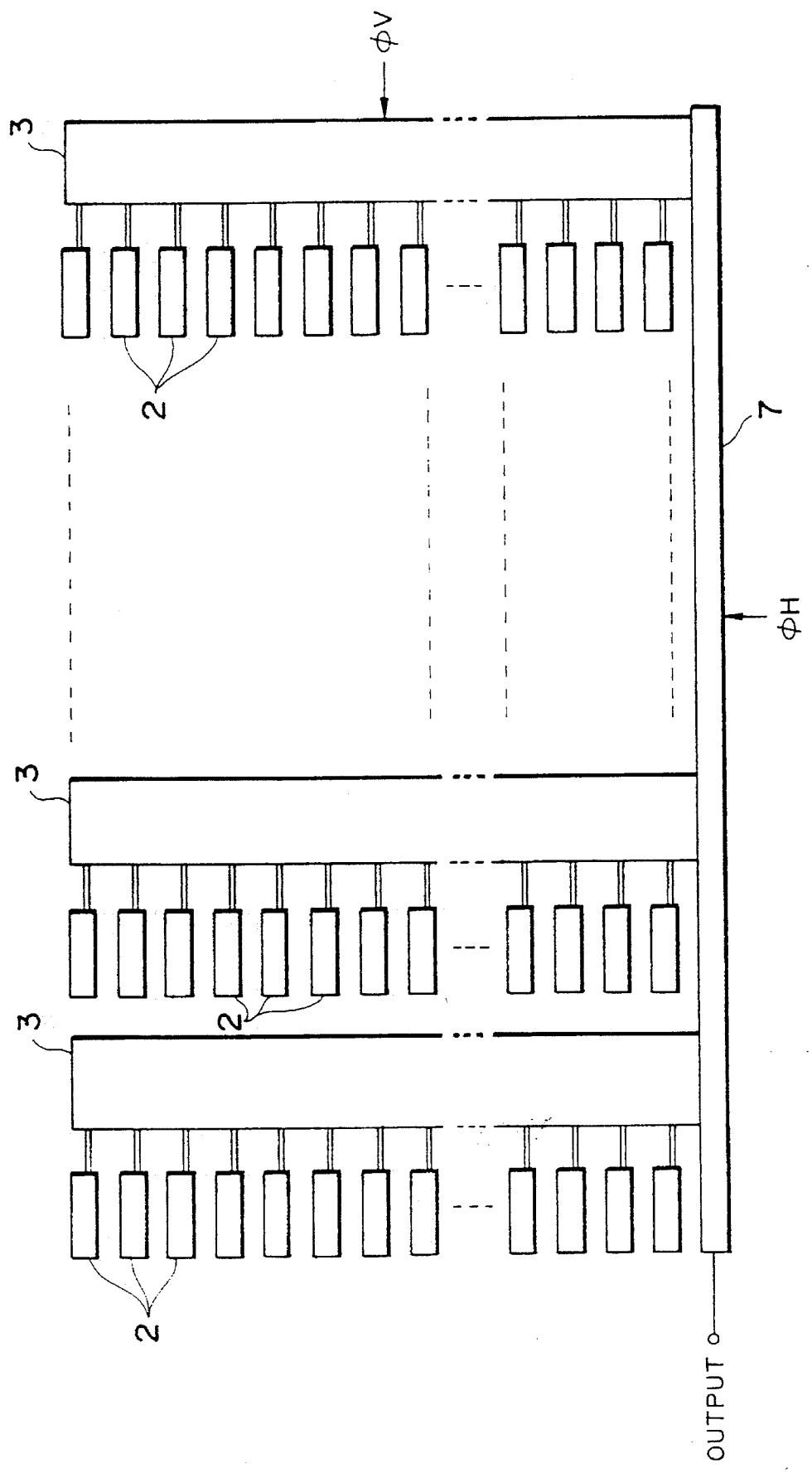
FIG. 29 is a schematic view of a CCD.
Figure 30:
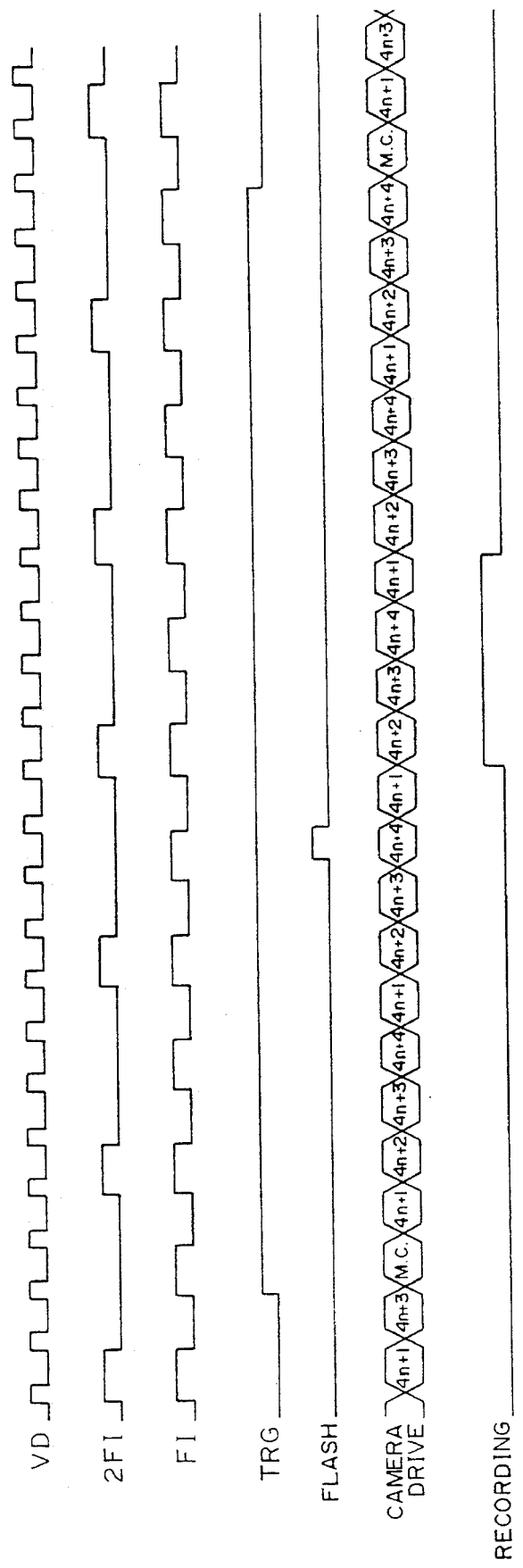
FIG. 30 is a time chart illustrating the photographic sequence of a subject.

FIGS. 28 through 30 illustrate the details of the electronic camera 10, especially a series of photographic operations.

FIG. 28 is a block diagram showing the details of the electrical construction of the electronic camera 10, FIG. 29 is a schematic view of the CCD, and FIG. 30 is a time chart of operation when the electronic camera 10 images a subject. In this embodiment, the amount of exposure is adjusted by the f-stop value and shutter speed.

Processing executed when image data representing a subject is recorded will now be described with reference to FIGS. 28 through 30.

The electronic camera 10 can be divided into a camera head 49 and a camera controller 59. By thus dividing the electronic camera 10, the electronic camera is made one of the type having a separable head.

In order to read out the signal charge of the CCD 12, the camera head 49 includes a timing pulse generator 44 for generating horizontal (H) driving pulses and vertical (V) driving pulses at a predetermined timing. The camera head 49 includes also a PLL circuit 43. The timing pulse generator 44 operates based upon a horizontal retrace signal (HD) and a vertical retrace signal (VD) provided by the PLL circuit 43. A strobe-flash unit 48 also has firing of the flash controlled by the timing pulse generator 44.

The camera head 49 includes an H driver 45 and a V driver 46 in order to read out the signal charge from the CCD 12. The H driving pulses are inputted to the H driver 45, which outputs horizontal transfer pulses φH. The V driving pulses are inputted to the V driver 46, which outputs vertical horizontal transfer pulses φV. The camera head 49 further includes a preamplifier circuit 41 and a driver 42 for amplifying the signal outputted by the CCD 12.

Further, the camera head 49 includes a power-supply circuit 47, which supplies each of the circuits with operating voltage.

The camera controller 59 includes a timing control unit 55 for generating recording timing, and a timing pulse generator 56 which provides the PLL circuit 43 with signals such as a horizontal retrace signal and a vertical retrace signal.

The timing control unit 55 outputs a trigger signal TRG, which serves as a reference for recording timing, a mode-change signal M.C., and field-index signals FI, 2FI. All of these signals are applied to the timing pulse generator 44.

The mode-change signal M.C. is a signal which changes over between an instance in which one frame is constructed by two field signals and an instance in which one frame is constructed by four field signals, as will be described below.

The field index signal FI is a signal used in identifying a field signal when one frame is constructed by two field signals. The field index signal 2FI is a signal used in identifying a leading field signal when one frame is constructed by four field signals.

Since the field index signals FI and 2FI can be created from the vertical retrace signal VD, they need not necessarily be created in the timing control unit 55.

The camera controller 59 further includes a signal processing circuit 14, an A/D converting circuit 15, a memory-controller/memory unit 53, a D/A converting circuit 16 and a power-supply circuit 57. The signal processing circuit 14, which includes a color-balance circuit 51 and a gamma processing circuit 52, executes the above-described white balance and black balance processing, as well as gamma-correction processing.

The camera controller 59 is provided with a recording switch 58. The recording switch 58 is turned on (closed) when image data of a subject is to be recorded on the optical disk. This is realized by the keyboard 36 and mouse 37 in FIG. 2. Turning on the switch 58 is equivalent to turn-on by clicking "Shot" using the mouse.

The PLL circuit 43, timing-pulse generating circuit 44, timing control unit 55 and timing pulse generator 56 are included in the camera control unit 18 in FIG. 2, and the memory-controller/memory unit 53 is constructed by part of the camera control unit 18 and the image memory 16.

The preamplifier circuit 41, driver 42, H driver 45, V driver 46 and power-supply circuit 47 are not shown in FIG. 2. Furthermore, the main memory 17, thinning-out circuit 19 and communication interface 9 are not illustrated in FIG. 28.

As depicted in FIG. 29, the CCD 12 comprises a number of photodiodes 2 arrayed in row and column directions. The CCD 12 further includes vertical transfer lines 3, which are arranged contiguous to the photodiodes 2 in the column direction, for vertically transferring the signal charge that has accumulated in the photodiodes 2, and a horizontal transfer line 7 for horizontally transferring the signal charge.

The method through which the signal charge stored in the photodiodes 2 of the CCD 12 of the electronic camera 10 when recording is being performed differs from that when recording is not being performed.

When the electronic camera 10 is not recording, a field signal represented by the signal charge stored in the photodiodes 2 of a (4n+1)-th row (where n is 0 or a positive integer) is treated as a first field signal, a field signal represented by the signal charge stored in the photodiodes 2 of a (4n+3)-th row is treated as a second field signal, and one frame is constructed by these first and second field signals.

When the electronic camera 10 is recording, a field signal represented by the signal charge stored in the photodiodes 2 of a (4n+1)-th row is treated as a first field signal, a field signal represented by the signal charge stored in the photodiodes 2 of a (4n +2)-th row is treated as a second field signal, a field signal represented by the signal charge stored in the photodiodes 2 of a (4n+3)-th row is treated as a third field signal and a field signal represented by the signal charge stored in the photodiodes 2 of a (4n+4)-th row is treated as a fourth field signal, and one frame is constructed by these first through fourth field signals.

The timing generator 44 operates in such a manner that the output timings of the horizontal transfer pulses φH and vertical transfer pulses φV at the time of recording also differ from those when recording is not being performed. At the time of recording, the horizontal transfer pulses φH outputted are twice the number outputted when recording is not being performed.

Sweep-out of smear charge and level matching of dark currents field by field are carried out in the electronic camera 10. The time period from rise of the vertical retrace signal VD after issuance of a photographic command to firing of the flash, the time period from rise of the vertical retrace signal VD to sweep-out of smear charge, and the time period from the vertical retrace signal VD to readout of the signal charge are predetermined using the keyboard 36 and mouse 37. The readout time of the signal charge is decided in such a manner that the readout time of each field signal will become a whole-number multiple of 4 V (where 1 V represents one vertical retrace interval), so that the quantity of stored signal charge due to dark current will not differ from field to field. The time from the photographic command to firing of the strobe, the time from the photographic command to sweep-out of smear charge, and the time from the photographic command to readout of the signal charge are stipulated in accordance with respective ones of the aforesaid predetermined times.

The shutter 8 is open until the recording switch 58 is pressed or until "Shot" is clicked. Photography and readout of the signal charge are repeated at an interval that is twice the vertical retrace interval. At this time, one frame is constructed by the first field signal and the second field signal, and the frame is displayed on the monitor display unit 5.

When the recording switch 58 is pressed, or when "Shot" is clicked as set forth above, the trigger signal TRG is outputted by the timing control unit 55 in synchronization with the first vertical retrace signal VD that follows the pressing or clicking operation. When the trigger signal TRG is outputted, a mode change is performed in such a manner that one frame will be constructed by the first through fourth field signals.

When the trigger signal TRG is generated, the flash 48 is fired to effect exposure after sweep-out of unnecessary electric charge from the CCD 12 is performed following a predetermined fixed period of time after generation of the trigger signal TRG. When exposure is performed, the shutter 8 is subsequently closed fully and sweep-out of the smear charge is performed. When sweep-out of the smear charge ends, the signal charge is read out and writing of the image data in the memory 53 is performed for a time equivalent to 4 V.

When recording of the image data ends, the trigger signal TRG decays, the shutter 8 is opened again and one frame is constructed by the first field signal and second field signal.

In a predetermined time period following the rise of the trigger signal TRG, firing of the strobe, exposure, sweep-out of smear charge, readout of signal charge and recording are controlled. As a result, the number of control lines can be reduced in comparison with the prior art, in which firing of the strobe, exposure, sweep-out of smear charge, readout of signal charge and recording are controlled independently of one another.

Since the signal charges of pixels are read in high definition over four fields, recording can be performed in a highly precise manner.

As many apparently widely different embodiments of the present invention can be made without departing from the spirit and scope thereof, it is to be understood that the invention is not limited to the specific embodiments thereof except as defined in the appended claims.

What is claimed is:

1. An imaging system comprising:

an electronic camera, which has electronic image pick-up processing means for photographing a subject and producing image data representing a frame of an image of the photographed subject; and a computer system equipped with a display unit and an input unit, said computer system gerating a preview command and being connected to said electronic camera by a communication line, said electronic camera comprising an image memory for storing the image data produced by said electronic image pick-up processing means, reducing means, coupled to said image memory, for reducing the amount of stored image data representing a frame of the photographed subject by a predetermined amount, and first response means, operative when the preview command is received from said computer system, for instructing said reducing means to reduce the stored image data by the predetermined amount and for transmitting the reduced image data to said computer system, said computer system comprising first command means for transmitting the preview command to said electronic camera when a preview input is applied through said input unit, and first display control means, operative when the reduced image data transmitted from said first response means of said electronic camera in response to the preview command has been received, for displaying a reduced preview image, which is represented by the reduced image data, on said display unit.

2. The imaging system according to claim 1, wherein said first command means of said computer system transmits a photographic command to said electronic camera before the preview command, said electronic camera further comprising photography control means for performing control in such a manner that said electronic image pick-up processing means starts photography of the subject in response to the photographic command.

3. The imaging system according to claim 1, wherein said input unit of said computer system comprises:

means for applying the preview input;

means for designating an area to be cut as an area of a main image of the reduced preview image displayed on said display unit;

means for designating a magnification of the main image; and means for applying a get input for accepting the main image.

4. The imaging system according to claim 1, wherein said computer system generates a get command and wherein said electronic camera further comprises:

second response means operative when the get command, containing data designating magnification of a main image and an area to be cut from the reduced preview image as an area of the main image, has been applied from said computer system, for creating main-image data and for transmitting the main-image data to said computer system, wherein the main-image data comprises the image data of the designated area having the designated magnification, and said computer system further comprises second command means, operative when the magnification of the main image, the designation of the area of the main image and a get input indicative of acceptance of the main image have been applied through said input unit, for transmitting the get command, which contains the data indicative of the designated magnification and area, to said electronic camera; and second display control means, operative when the main-image data transmitted from said second response means of said electronic camera in response to the get command has been received, for displaying the main image represented by the main-image data on said display unit.

5. The imaging system according to claim 4, wherein when the designated magnification is less than 1, said second response means instructs said reducing means to reduce the image data, which has been stored in said image memory, by the designated magnification.

6. The imaging system according to claim 4, wherein said electronic camera further comprises a zoom mechanism for enlarging and forming an image of the subject and means for sensing enlargement magnification performed by said zoom mechanism, a magnification which exceeds 1 being designated using said input unit of said computer system when the image of the subject is enlarged by said zoom mechanism.

7. The imaging system according to claim 4, wherein the reduced preview image and the main image are displayed in separate display areas on said display unit of said computer system.

8. The image system according to claim 4, wherein said computer system further comprises an internal main memory and an external storage device, said input unit further comprising selecting means for selecting one of said internal main memory or said external storage device, and said computer system further comprising memory storage control means for storing the received main-image data in one of said internal main memory or said external storage device in dependence upon selection performed by said selecting means.

9. The imaging system according to claim 8, wherein said computer system further comprises means for performing control in such a manner that a remaining capacity of said internal main memory and a volume of the received main-image data are calculated and displayed on said display unit.

10. The imaging system according to claim 1, wherein said computer system further comprises control-parameter command means for setting control parameters, which are for photography of the subject by said electronic image pick-up processing means of said electronic camera and which are input via said input unit, and for transmitting the set control parameters to said electronic camera, said electronic image pick-up processing means of said electronic camera executing image pick-up processing in conformity with the set control parameters transmitted by said control-parameter command means.

11. The imaging system according to claim 1, wherein said electronic camera is provided with a monitor display unit for displaying the image of the subject imaged by said electronic image pick-up processing means.

12. The imaging system according to claim 1, wherein said computer system is provided with a monitor display unit for displaying the image of the subject imaged by said electronic image pick-up processing means of said electronic camera.

13. An electronic camera connectable to and communicating with a computer system, said computer system generating a preview command, the electronic camera comprising:

electronic image pick-up processing means for photographing a subject and producing image data representing an image of the photographed subject;

an image memory for storing the image data produced by said electronic image pick-up processing means;

reducing means, coupled to said imaqe memory, for reducing the amount of stored image data representing a frame of the photographed subject by a predetermined amount; and first response means, operative when the preview command has been applied thereto from said computer system, for directing said reducing means to reduce the stored image data by the predetermined amount and for transmitting the reduced image data to said computer system.

14. The electronic camera according to claim 13, wherein said computer system generates a photographic command, the electronic camera further comprising:

photography control means for performing control in such a manner that said electronic image pick-up processing means starts photography of the subject in response to receipt of the photographic command from said computer system.

15. The electronic camera according to claim 13, wherein said computer system displays a reduced preview image representing the reduced image data and generates a get command, the electronic camera further comprising:

second response means operative when the get command containing data designating magnification of a main image and an area to be cut from the reduced preview image as an area of the main image, is received from said computer system, for creating main-image data and for transmitting the main-image data to said computer system, wherein the main-image data comprises the image data of the designated area having the designated magnification.

16. A computer system connectable to and communicating with an electronic camera, said electronic camera producing image data representing an image of a photographed subject, the computer system comprising:

an input unit for applying a preview input;

first command means for transmitting a preview command to said electronic camera when the preview input has been applied through said input unit, the preview command directing said electronic camera to reduce the amount of image data representing a frame of the photographed subject by a predetermined amount and to transmit the reduced image data to the computer system; and first display control means, operative when the reduced image data produced and transmitted by said electronic camera in response to the preview command has been received by the computer system, for displaying a reduced preview image, which is represented by the reduced image data, on a display unit.

17. The computer system according to claim 16, wherein said first command means transmits a photographic command to said electronic camera before the preview command.

18. The computer system according to claim 16, wherein said input unit comprises:

means for designating an area to be cut from the reduced preview image displayed on said display unit as an area of a main image;

means for designating magnification of the main image; and means for applying a get input for accepting the main image.

19. The computer system according to claim 18, further comprising:

second command means, operative when the magnification of the main image, the designation of the area to be cut as the area of the main image and the get input indicative of acceptance of the main image have been applied through said input unit, for transmitting a get command, which contains data indicative of the designated magnification and area, to said electronic camera; and second display control means, operative when main-image data transmitted from said electronic camera in response to the get command has been received, for displaying the main image represented by the main-image data on said display unit.

20. The computer system according to claim 19, further comprising an internal main memory and an external storage device, said input unit further comprising selecting means for selecting one of said internal main memory or said external storage device, the received main-image data being stored in one of said internal main memory or said external storage device in dependence upon selection performed by said selecting means.

21. The computer system according to claim 16, further comprising control-parameter command means for setting control parameters, which are for photography of the subject by said electronic camera and which are input via said input unit, and for transmitting the set control parameters to said electronic camera.

22. A method of controlling an electronic camera connectable to and communicating with a computer system, comprising:

photographing a subject in response to receipt of a photographic command applied from the computer system;

producing image data representative of an image of the photographed subject;

storing the image data;

reducing the amount of stored image data representing a frame of the photographed subject by a predetermined amount in response to receipt of a preview command applied from the computer system; and transferring the reduced image data to the computer system.

23. The method of controlling an electronic camera according to claim 22, further comprising starting photography of the subject in response to receipt of a photographic command applied from the computer system.

24. The method of controlling an electronic camera according to claim 22, wherein the computer system displays a reduced preview image representing the reduced image data, the method further comprising:

creating main-image data representing a designated area and having a designated magnification from the stored image data and transferring the main-image data to the computer system upon receipt of a get command from the computer system, the get command containing data designating magnification of a main image and data desiqnating an area to be cut from the reduced preview image as an area of the main image.

25. A method of controlling a computer system connectable to and communicating with an electronic camera, comprising:

transferring a photographic command to the electronic camera in response to application of a photographic input to the computer system, the photographic command directing the electronic camera to begin photography of a subject to produce image data of the photographed subject;

transferring a preview command to the electronic camera in response to application of a preview input to the computer system, the preview command directing the electronic camera to reduce the amount of image data representing a frame of the photographed image and to transfer the reduced image data to the computer system; and displaying a reduced preview image, which is represented by the reduced image data, upon receipt of the reduced image data from the electronic camera.

26. The method of controlling a computer system according to claim 25, further comprising:

transferring a get command, which contains data designating a magnification and an area of the reduced preview image as a main imaqe of the imaqe data of the photographed subject, to the electronic camera in response to application of a magnification input and an area input to the computer system, the electronic camera transferring main-image data representing the designated area having the designated magnification to the computer system in response to receipt of the get command from the computer system; and displaying the main image represented by the main-image data.

27. The method of controlling a computer system according to claim 25, further comprising storing the main-image data in an internal main memory of the computer system or in an external storage device in response to application of a selection input to the computer system indicative of a storaqe mode.

28. The method of controlling a computer system according to claim 25, further comprising setting control parameters, which are for photography of the subject by the electronic camera and transferring the set control parameters to the electronic camera in response to application of parameter control inputs to the computer system.

29. The imaging system according to claim 1, wherein said electronic camera is connectable to a monitor display unit for displaying the image of the subject imaged by said electronic image pick-up processing means.

30. The image system according to claim 1, wherein said computer system is connectable to a monitor display unit for displaying the image of the subject imaged by said electronic image pick-up processing means of said electronic camera.

31. A method of imaging a subject with an electronic camera under control of a computer system coupled to the electronic camera, the method comprising the steps of:

generating a preview command and a photograph command in response to respective application of a preview input and a photograph input to the computer system;

transmitting the preview command and the photograph command to the electronic camera, the electronic camera photographing the subject to produce image data of the photographed subject and storing the image data in response to receipt of the photograph command from the computer system, the electronic camera reducing the amount of stored image data representing a frame of the photographed subject by a predetermined amount and transmitting the reduced image data to the computer system in response to receipt of the preview command; and displaying a reduced preview image in accordance with the reduced image data transmitted from the electronic camera.

32. The method of imaging of claim 31, further comprising:

generating a get command designating an area to be cut from the reduced preview image as an area of a main image and a magnification of the main image in response to application of an area input and a magnification input to the computer system;

transmitting the get command to the electronic camera, the electronic camera creating main-image data from the stored image data in accordance with the designated area and the designated magnification and transmitting the main-image data to the computer system in response to receipt of the get command; and displaying the main image in accordance with the main-image data transmitted from the electronic camera.

33. The method of imaging of claim 32, further comprising:

storing the main-image data transmitted from the electronic camera in an internal main memory of the computer system or an external storage device of the computer system in accordance with a selection input applied to the computer system indicative of a desired storage mode.

34. The method of imaging of claim 31, further comprising:

setting control parameters for photography of the subject by the electronic camera in response to application of control parameter inputs to the computer system; and transmitting the set control parameters to the electronic camera, the electronic camera executing photography in conformity with the set control parameters transmitted from the computer system.

35. The method of imaging of claim 34, wherein at least one of the control parameters is set automatically by the computer system.

36. The method of imaging of claim 34, wherein said step of setting control parameters comprises setting at least one of the control parameters in accordance with selection of previously determined stored control parameter values.

* * * * *